(12) United States Patent (10) Patent No.: US 8,537,663 B2
Poulson et al. (45) Date of Patent: Sep. 17, 2013

(54) SYSTEMS AND METHODS FOR SEAMLESS COMMUNICATIONS RECOVERY AND BACKUP

(75) Inventors: Chris Stewart Poulson, Bluffdale, UT (US); James Rex Gledhill, Sandy, UT (US); Timothy Alan Ruff, Herriman, UT (US)

(73) Assignee: Telecom Recovery, Draper, UT (US)

( * ) Notice: Subject to any disclaimer, the term of this patent is extended or adjusted under 35 U.S.C. 154(b) by 80 days.

(21) Appl. No.: 13/302,779

(22) Filed: Nov. 22, 2011

(65) Prior Publication Data

US 2012/0213060 A1 Aug. 23, 2012

Related U.S. Application Data

(63) Continuation-in-part of application No. 12/715,364, filed on Mar. 1, 2010, now Pat. No. 8,310,918.

(60) Provisional application No. 61/156,349, filed on Feb. 27, 2009.

(51) Int. Cl.
*H04L 12/26* (2006.01)
*H04L 12/28* (2006.01)
*G06F 15/173* (2006.01)

(52) U.S. Cl.
USPC .......................... 370/228; 370/401; 709/239

(58) Field of Classification Search
None
See application file for complete search history.

(56) References Cited

U.S. PATENT DOCUMENTS

| 6,356,622 | B1 | 3/2002 | Hassell et al. | |
|---|---|---|---|---|
| 6,442,614 | B1 * | 8/2002 | Rahman | 709/239 |
| 7,403,475 | B1 * | 7/2008 | Saxena et al. | 370/228 |
| 7,861,002 | B2 * | 12/2010 | Puon et al. | 709/239 |
| 2002/0118688 | A1 | 8/2002 | Jagannathan | |
| 2003/0200311 | A1 | 10/2003 | Baum | |
| 2004/0218609 | A1 * | 11/2004 | Foster et al. | 370/401 |
| 2005/0174935 | A1 * | 8/2005 | Segel | 370/228 |
| 2005/0227678 | A1 | 10/2005 | Agrawal et al. | |
| 2013/0016822 | A1 | 1/2013 | Vendrow | |

OTHER PUBLICATIONS

Office Action for U.S. Appl. No. 13/302,842 filed Nov. 22, 2011, and mailed from the USPTO on Mar. 5, 2013, 23 pgs.
Office Action for U.S. Appl. No. 12/715,364 filed Mar. 1, 2012, mailed from USPTO May 22, 2012, 12 pgs.
Notice of Allowance and Fee(s) Due for U.S. Appl. No. 12/715,364 filed Mar. 1, 2010, and mailed Aug. 29, 2012, 7 pgs.

* cited by examiner

*Primary Examiner* — Clemence Han
(74) *Attorney, Agent, or Firm* — John R. Thompson; Stoel Rives LLP

(57) ABSTRACT

A recovery network may provide communication recovery and backup services to a carrier having a service area. The recovery network may be configured to communicatively couple the carrier to the public communication network (PCN) using one or more alternative communication paths, such as a satellite network. The alternative communication paths may couple the recovery network to the carrier independently of the PCN. When the carrier detects a failure in its uplink to the PCN, it may failover to the recovery network, which may service the communication requests using the alternative communication path(s). Similarly, the recovery network may be used to service inbound communication requests directed to the carrier or other organization, such as a Public Safety Answering Point (PSAP). When used with a PSAP, the recovery network may be configured to access and/or provide metadata related to inbound communication requests.

28 Claims, 9 Drawing Sheets

300 —↘

Recovery Rules
310↘      320↘

| Communication Request | Processing |
|---|---|
| 801-555-1223 | Service using Satellite Network |
| 801-555-134* | Redirect to 345-555-134* |
| 800-555-134* | Service using Satellite Network |
| 168.34.23.* | Alternative Network – Radio |
| ceo@organization.com | Redirect to ceo@alt_server.com |
| 801-555-1225 | ceo_voicemail@alt_server.com |
| 801-555-188* | Backup |
| 801-555-199* | Automated calling system (Org,1) |
| 911 | EMS dispatch Network |
| ... | ... |

311 → 801-555-1223 / 321
312 → 801-555-134* / 322
313 → 800-555-134* / 323
314 → 168.34.23.* / 324
315 → ceo@organization.com / 325
316 → 801-555-1225 / 326
317 → 801-555-188* / 327
318 → 801-555-199* / 328
319 → 911 / 329

Figure 3A

Recovery Rules
330↘

| Communication Request | Processing |
|---|---|
| [1] 801-555-1223 | Service using Internet |
| [2] 801-555-1223 | Service using Satellite Network |
| [3] 800-555-1223 | Redirect to 345-555-1349 |
| [4] 800-555-1223 | Backup |
| [*] * | Automated calling system (Org. 1) |
| ... | ... |

SYSTEMS AND METHODS FOR SEAMLESS COMMUNICATIONS RECOVERY AND BACKUP

CROSS-REFERENCE TO RELATED APPLICATIONS

This application claims priority U.S. patent application Ser. No. 12/715,364, filed Mar. 1, 2010, and entitled, "System and Methods for Seamless Communications Recovery and Backup," which claims priority to U.S. Provisional Application No. 61/156,349, filed Feb. 27, 2009, and entitled, "Systems and Methods for Seamless Communications Recovery and Backup," each of which is hereby incorporated by reference in its entirety.

TECHNICAL FIELD

This disclosure relates to communication systems and, in particular, to systems and methods for providing seamless communications recovery and backup services.

BRIEF DESCRIPTION OF THE DRAWINGS

FIG. 3A shows one example of a set of recovery rules;

FIG. 3B shows another example of a set of recovery rules;

DETAILED DESCRIPTION OF PREFERRED EMBODIMENTS

Communication systems are critical for many organizations. However, it may be difficult to regain control of incoming and outgoing communications during emergency or other conditions, such as equipment failure, cabling failure, power system anomalies, disaster conditions (e.g., fire, earthquake, etc.), and the like.

Figure 1:
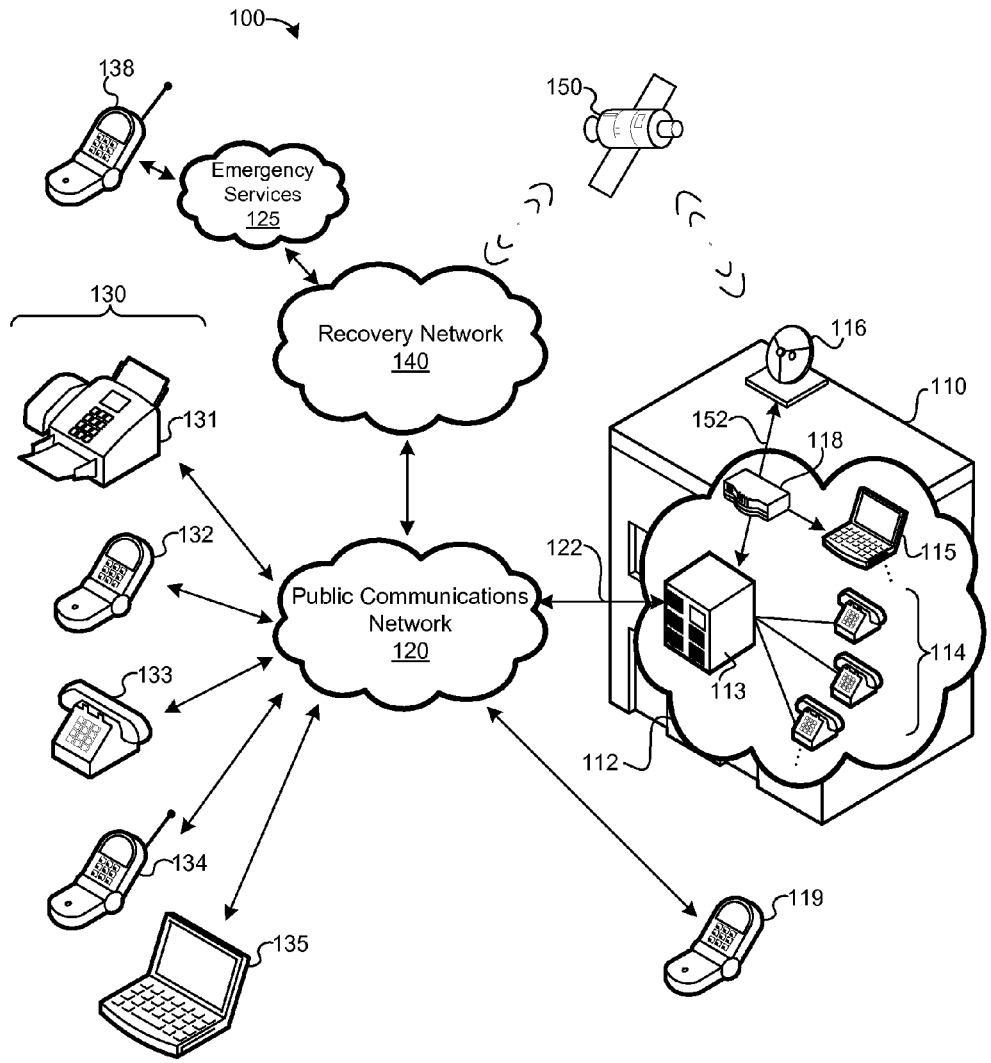
FIG. 1 is a block diagram of one embodiment of a system for providing seamless communications recovery and backup services.

FIG. 1 depicts a system 100 for providing communications recovery and backup services to an organization 110. The organization 110 includes a communication system 112, which communicatively couples the organization 110 to a public communication network (PCN) 120. The PCN 120 may encompass any communications network known in the art, including but not limited to: a public switched telephone network (PSTN), a cellular communications network, an Internet Protocol (IP) Network implementing voice-over-IP (VoIP), a radio network (e.g., emergency services radio network), or the like.

The communication system 112 of the organization 110 includes a private branch exchange (PBX) 113 to couple the communications devices 114 of the organization 110 to the PCN 120 via a communications line 122. In addition, various computing devices 115 may be coupled to a network via the PBX 113 and/or PCN 120. Although organization 110 is shown as connected to the PCN 120 via a PBX 113, any connection method and/or connection device could be used under the teachings of this disclosure, such as an internet router, integrated access device, etc.

The communications line 122 may include a fiber-optic line (e.g., a T1 line) and/or any other data communications medium known in the art (e.g., copper cabling, wireless transmission, or the like). The communications devices 114 of the organization 110 may include, but are not limited to: telephones, fax machines, computing devices (e.g., personal computers), automated calling systems, voicemail systems, voice conferencing systems, group-messaging systems, radio systems, and the like.

The connection 122 between the organization 110 and the PCN 120 may allow the organization 110 to communicate with other entities 130. The entities 130 may communicate with the organization 110 using various communications devices and according to various communications protocols including, but not limited to: fax 131, cellular telephone 132, land-line telephone 133, satellite phone 134, computing device 135 (e.g., over the Internet), and the like.

Communications between the entities 130 and the organization 110 can be disrupted by a fault condition occurring within the PCN 120 and/or between the PCN 120 and the organization 110 (e.g., on the communication line 122), and/or within the organization 110 itself (e.g., the PBX 113). As used herein, a fault condition may refer to any condition wherein services provided to the organization 110 by the PCN 120 are disrupted or degraded.

For example, portions of the PCN 120 may experience equipment failure, power loss, or the like. These faults may disrupt the connection between the PCN 120 and the organization 110 (e.g., PBX 113). Alternatively, or in addition, a fault not directly related to the PCN's 120 connection to the organization 110 may cause loss of services for the organization 110. For example, due to faults in other portions of the PCN 120, the PCN 120 may allocate resources normally used to service the organization 110 to servicing other customers (not shown), which may degrade the services available to the organization 110. Similarly, faults may occur on the communications line 122 connecting the organization 110 to the PCN 120, such as a line cut, or other physical damage.

A fault condition may additionally encompass any condition within the organization 110 that would preclude normal operation of the communication system 112 (e.g., a robbery within a banking organization 110, a fire, chemical spill, hardware and/or software failure of the PBX, power failure, or the like). Therefore, although selected fault types and fault scenarios are discussed herein, one skilled in the art would recognize that there are virtually unlimited different ways in which the services between the PCN 120 and the organization 110 could be disrupted. Each of these possible fault types and/or scenarios falls within the scope of this disclosure. Therefore, this disclosure should not be read as limited to any particular fault type or fault scenario.

A recovery network 140 may provide communication recovery services to the organization 110. The recovery services may be activated during a fault condition or other disruption of service between the organization 110 and the PCN 120. As used herein, recovery services may include a full replacement of the communications services provided by the PCN 120, replacement of a different or alternative set of communications services, and/or supplemental replacement of the services provided by the PCN 120 (e.g., the recovery network 140 may provide communications services in parallel with the PCN 120). The nature of the recovery services provided to the organization 110 may be defined by configuration information maintained by the organization 110. As will be discussed below, the configuration information may include one or more recovery rules to specify how particular communications are to be processed by the recovery network 140.

The recovery network 140 may provide an alternative communication path by which communication between the entities 130 and the organization 110 may be maintained during a disruption of service in the PCN 120 or elsewhere. For example, in some embodiments, the recovery network 140 may configure the PCN 120 to divert incoming communication requests directed to the organization 110 (e.g., incoming calls, faxes, email messages, etc.) to the recovery network 140. The recovery network 140 may service the communication requests using an alternative communication path, such as a satellite network 150, as shown in FIG. 1.

As will be discussed below, when active, the recovery network 140 may selectively service communication requests directed to the organization 110 using one or more alternative communications paths, by routing the requests to alternative addresses (e.g., phone numbers) within the PCN 120, by providing equivalent services (e.g., providing a phone tree, directory, etc.), and/or by backing up the communication requests. The determination of which requests should be handled in which manner (as opposed to handling the requests using other recovery mechanisms) may be specified in configuration information maintained within the recovery network 140. For instance, the configuration information for the organization 110 may include a "recovery rule" to specify that requests directed to a particular number within the organization (e.g., premier customer hotline) be routed directly to the organization 110 via the satellite network 150. Other recovery rules may specify how the recovery network 140 is to process other communication requests. For instance, a recovery rule may specify that calls to a general customer information telephone number be routed to an automated phone tree, or to another destination in the PCN 120, such as a cellular telephone or landline (e.g., to save bandwidth on the satellite network 150 for more important communications).

As shown in FIG. 1, the alternative communication path, satellite network 150, may provide a communication link between the recovery network 140 and organization 110 that is independent of the PCN 120. Therefore, the recovery network 140 may be capable of providing communications services for the organization 110 regardless of (e.g., independently of) the organization's 110 connectivity to the PCN 120.

Although the alternative communication path 150 is shown in FIG. 1 as a satellite network 150, any alternative communication path known in the art could be used. Examples of alternative communication paths include, but are not limited to: one or more wireless networks (e.g., a wireless point-to-point network), one or more radio frequency (RF) network, a dedicated, wired network, an IP network, a cellular network, a combination of networks, or the like. Therefore, this disclosure should not be read as limited to any particular type of alternative communication path.

The organization 110 may be communicatively coupled to the satellite network 150 using appropriate communications equipment. In the FIG. 1 example, the organization 110 is coupled to the satellite network 150 via a satellite interface 116. The satellite interface 116 and/or satellite network 150 may be capable of supporting the equivalent of one of more T1 connections (e.g., such as the connection 122 to the PCN 120), which can be used for both voice and data communications. The communications bandwidth available through the satellite network 150 and/or interface 116 may be further expanded by compressing the data transmitted thereon (discussed below).

The satellite interface 116 includes appropriate power and other equipment (e.g., satellite dish) for reception and transmission of data over the satellite network 150. In some embodiments, the satellite interface 116 may further include a backup power source (not shown) to power the satellite interface 116 and/or the other communications components of the organization 110 (e.g., components 113, 114, and 118) in the event of a power outage or other power supply anomalies, such as power spikes, brown-outs, or the like.

The satellite interface 116 may include a gateway 118 to integrate the communication system 112 with the satellite network 150. As will be discussed in additional detail below, the gateway 118 may be configured to process incoming and outgoing communications on the satellite network 150. The inbound data processing may include, but is not limited to decompressing, decrypting, authenticating, formatting, and de-multiplexing data received on the satellite network 150. The outbound data processing may include, but is not limited to compressing, encrypting, authenticating, formatting, and multiplexing data for transmission on the satellite network 150.

The gateway 118 receives data over the satellite network 150 (e.g., via the satellite interface 116). The data may be encrypted (e.g., scrambled) using a particular encryption algorithm. The gateway 118 may be configured to decrypt the data using a shared key, a negotiated key, a secret key, or other data security mechanism (e.g., Public Key Infrastructure (PKI) or the like).

The data transmitted on the satellite network 150 may be compressed using a particular compression algorithm or technique (e.g., the data may be compressed at a 16:1 compression ratio). The gateway 118 may decompress the incoming data to allow the data to be used by the communication system 112 (e.g., used by the PBX 113 and/or computing devices 115).

The gateway 118 may be further configured to de-multiplex the incoming data to determine the routing of the data within the communication system 112. The data transmitted over the satellite network 150 may include a plurality of multiplexed data streams (e.g., voice call streams, fax streams, IP data streams, and so on). The gateway 118 may be configured to identify and de-multiplex the various data streams within the incoming data (e.g., identify and de-multiplex voice data, fax data, IP network data, and so on). The gateway 118 may then process (e.g., format) and/or route the de-multiplexed data to the appropriate receiver within the communication system 112 (e.g., route voice/fax data to the PBX 113, route IP network data to the computing devices 115, and so on).

The gateway 118 may be further configured to format data received via the satellite network 150. For instance, voice/fax data may be converted from a format used to transmit the data on the satellite network 150 into a format that can be processed by the PBX 113. For example, the PBX 113 may be configured to receive voice communications data in Primary Rate Interface/Integrated Services Digital Network (PRI/ISDN) format. However, voice communication data may be transmitted from the recovery network 140 in a different format (e.g., the recovery network 140 may packetize the data for transmission over the satellite network 150, an IP network, or other network). The gateway 118 may convert the voice/fax data from the transmission format (e.g., IP packets) into the format used by the PBX 113 (e.g., PRI/ISDN format). The nature of the conversion at the gateway 118 may be adapted according to the configuration and capabilities of the communication system 112 (e.g., PBX 113). For example, in some embodiments, the PBX 113 may be configured to consume data in the Basic Rate Interface (BRI/ISDN) format or other format. The gateway 118 may be configured to convert data accordingly (e.g., into the format used by the PBX 113). Therefore, this disclosure should not be read as limited to any particular data formats and/or to any particular conversions therebetween.

The gateway 118 may be simultaneously coupled to an IP network of the organization 110 (e.g., comprising one or more computing devices 115) to provide IP networking services thereto. As such, the gateway 118 may be configured to de-multiplex and/or format inbound IP data received via the satellite network 150 from a format used on the satellite network 150 into a format that is usable by the computing devices 115 (e.g., formatted into IP packets, etc.). The IP network data processing may include de-multiplexing, decompressing, decrypting, and/or authenticating the data, as described above.

The gateway 118 may process outbound voice and data for transmission on the satellite network 150. As discussed above, the outbound data processing may include formatting, multiplexing, compressing, encrypting, and/or authenticating (e.g., digitally signing) the data for transmission on the satellite network 150. The gateway 118 may multiplex various types of data generated within the communication system 112 into one or more data streams (e.g., voice data, fax data, IP data, and so on). The gateway 118 may compress the outbound data according to a compression algorithm/technique for transmission over the satellite network 150 (e.g., compressed at 16:1 ratio). In addition, the gateway 118 may format the data into format used by and/or compatible with the satellite network 150 (e.g., packetize the data). The formatting may further include encrypting and/or authenticating (e.g., digitally signing) the data as described above. The nature of the multiplexing, compression, encryption, and/or authentication may be adapted according to the configuration and/or capabilities of the satellite network 150 and/or the satellite interface 116.

In this way, the gateway 118 may couple the communication system 112 to the satellite network 150 to allow communications data to be received and/or transmitted thereby. Accordingly, a switch-over from communications services provided by the PCN 120 to communications services provided via the satellite network 150 may be seamless (e.g., may not cause disruption within the organization 110 and/or may allow for continued use of the organization's 110 communication system 112, including the organization's 110 existing communication system 112 and/or computing devices 115).

In other embodiments, the gateway 118 may not be required. For example, the PBX 113 may be a VoIP PBX capable of processing data in the format used on the satellite network 150. In this case, the PBX 113 may be communicatively coupled directly to the satellite interface 116. In other embodiments, the communication system 112 may include a hardware/software VoIP client (not shown). The hardware/software VoIP client may be capable of processing data in the format used on the satellite network 150 and may, therefore, be coupled directly to the satellite interface 116.

The satellite interface 116 and/or gateway 118 may be interchangeable. For example, the organization may have several interfaces 116 and/or gateways 118 deployed at different locations (e.g., in different buildings, regions, and the like). Therefore, if one or more of the interfaces 116/gateways 118 is damaged, the recovery network 140 may be configured to use another interface 116/gateway 118. Similarly, the satellite interface 116 and gateway 118 devices may be mobile. This may allow the organization to move from one location to another with minimal disruption to its communications services or to provide service to additional locations. In some embodiments, the gateway 118 and/or satellite interface 116 may be mounted on or inside a vehicle (e.g., truck or trailer) and parked outside another location to deliver service where needed. Additionally, the gateway 118 device may be capable of dynamically restoring communication with the recovery network 140 using another network connection (e.g., in the event the satellite network 150 becomes unavailable, goes down, is overloaded, etc.). The gateway 118 may be decoupled from the satellite interface 116 and plugged into another high-speed network connection (e.g., a high-speed Internet connection, wireless IP, cellular, etc.) at any location worldwide. The gateway 118 may provide the same compression/decompression, encryption/decryption, format conversions and other processes at the new location using the new network connection. For example, the gateway 118 device may be decoupled from the satellite interface 116 and connected directly into the organization's 110 still-functional high-speed Internet connection. The recovery network 140 may immediately communicate with and identify the gateway 118 at the new location (e.g., IP address), and resume incoming and outgoing communications with the organization 110 utilizing the new pathway. In some embodiments, the gateway 118 device may utilize the high-speed internet connection by default, and may only switch over to the satellite interface 116 when necessary (e.g., upon detecting a failure and/or degradation of service in the Internet connection).

In some embodiments, the recovery network 140 may be configured to reroute some or all communication requests intended for the organization 110 to one or more other addresses within the PCN 120 (as opposed to routing the communication request to the organization 110 via the alternative communication path 150). The recovery network 140 may include configuration information for the organization 110 (discussed below) whereby the organization 110 may designate processing to be performed on particular communication requests. For example, the recovery rules, discussed above, may specify different processing for different types of communication requests (e.g., call requests directed to one or more telephone numbers, one or more fax numbers, to particular IP addresses, to particular email addresses, and the like). One or more of these recovery rules may specify that requests made to a particular address within the organization 110 be rerouted to an alternative address within the PCN 120. For example, during a failure condition of the PCN 120, the recovery network 140 may route calls made to a line dedicated to providing customer information to a recording and/or phone tree, which may provide responses to frequently asked questions. In this way, the organization 110 may free up bandwidth on the alternative communication path (satellite network 150) for communication requests deemed to be more important.

Alternatively, calls deemed to be particularly important may be routed to a direct response line 119, such as a cellular telephone or satellite phone. For instance, the organization 110 may be cut-off from normal interaction with the PCN 120 due an interruption of service (e.g., equipment failure, cable cut, power anomaly, fire, robbery, etc.). During the emergency condition, the recovery network 140 may be configured to route certain communication requests to the rapid response line 119 to allow the organization 110 to continue servicing customers and/or provide information to concerned parties (e.g., family members of the employees of the organization 110).

The recovery network 140 may provide additional interfaces by which external entities 130 (e.g., callers) may communicate with the organization 110. For example, the communication system 120 of the organization 110 may include a phone tree, dial-by-name directory, dial-by-extension directory, automated attendants, music while on hold, and the like. When the organization 110 is cut off from the PCN 120, however, these services may become unavailable. The recovery network 140 may be configured to provide these services such that, when the recovery network 140 is active, entities 130 may communicate with the organization 110 through the recovery network 140 much as they would with the organization 110 through the PCN 120, providing an important "business as usual" layer of transparency for callers. For example, the recovery network 140 may include a dual-tone multi-frequency (DTMF) interface, a text-to-speech service, or other services, by which the organization's services may be made available to the entities 130 (e.g., the organization's dial-by-directory service, one or more automated attendants, and other services). The organization 110 may provide configuration information (e.g., recovery rules, phone tree information, directory information, and the like), which may configure the recovery network 140 to emulate the operation of the organization's 110 communication system 120 (e.g., provide the same dial-by-name directory, extension directory, music on hold, and so on). The organization 110 may provide the recovery network 140 with voice recordings and other assets to allow the recovery network 140 to closely emulate the organization 110 (e.g., provide callers with the organization's 110 employee directory, prompts, music, branding, message, and the like).

In another embodiment, the recovery network 140 may re-route communications to an alternative communications network (e.g., to a network other than those in the PCN 120). Rerouting the communications to an alternative network may comprise converting communications data to/from one or more alternative formats. In one example, the recovery network 140 may communicatively couple the organization 110 to an emergency services network 125, which may comprise one or more radio frequency (RF) networks (e.g., dedicated RF channels, frequencies, and so on). The recovery network 140 may receive voice communications originating at the organization 110 (via an alternative communication path, such as the satellite network 150), and may forward the communication on the emergency services network 125. The forwarding may comprise forwarding the communication (which may have originally been voice telephone data, VoIP data, or the like), as an RF transmission. Data originating in the emergency services network 125 and directed to the organization 110 may be converted into an appropriate format and forwarded to the organization 110 via the satellite network 150. In this way, the organization 110 may communicate with an alternative communications network (e.g., an emergency services network 125) using its existing communications infrastructure 112.

As will be discussed below, the operation of the recovery network 140 may be controlled via a configuration interface (not shown). Personnel of the organization 110 may access the configuration interface to update the configuration information of the organization 110 in real time (e.g., activate/deactivate the recovery network 140, change communication routing settings, change alternative communication path settings, change caller-selectable options, record greetings and prompts, etc.).

Figure 2:
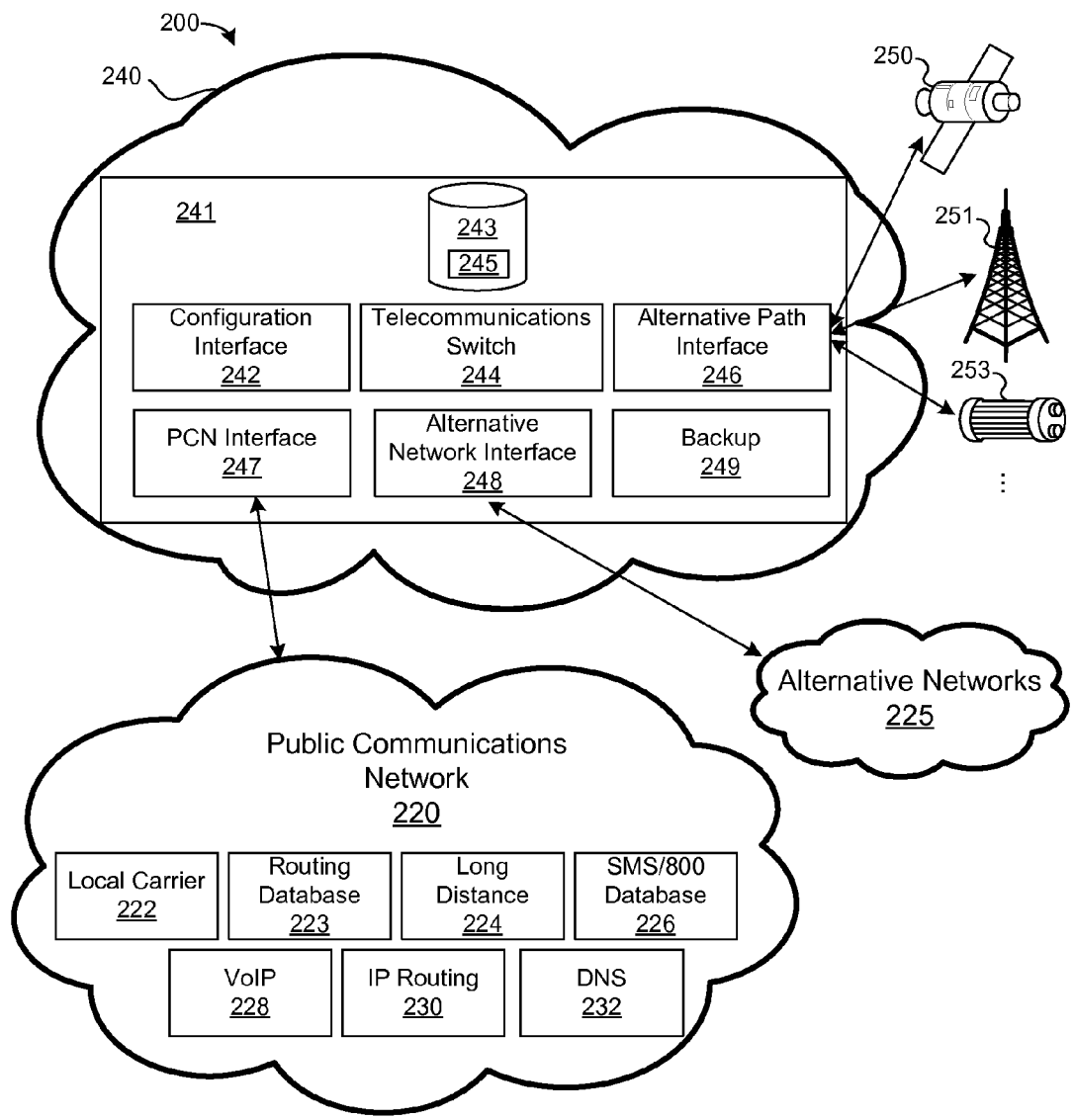
FIG. 2 is a block diagram of one embodiment of a recovery network.

FIG. 2 is a block diagram of a system 200 for providing recovery network services. The recovery network 240 of FIG. 2 may include one or more computing devices 241 (server computers). Each computing device 241 may include hardware components (not shown), including, but not limited to one or more processors, Application Specific Integrated Circuits (ASIC), Field Programmable Gate Arrays (FPGA), memory, one or more human machine interface (HMI) components, computer-readable storage media, one or more communications interfaces, and the like.

Although FIG. 2 depicts only a single computing device 241, the recovery network 240 may be implemented using plurality of computing devices in a clustered configuration (not shown). The clustered configuration may allow the recovery network 240 to provide concurrent recovery services for a plurality of different organizations (not shown). For example, the clustered configuration may allow the recovery network 240 to scale as required by the conditions at the organizations. Moreover, the clustered configuration may be spread over various different geographical regions such that, if one or more of the geographical regions of the recovery network 240 experiences a failure (e.g., power loss, communications failures, etc.), other portions of the recovery network 240 may continue to provide recovery services. Therefore, the clustered configuration of the recovery network 240 may include redundancy, such that the recovery network 240 may continue to provide services regardless of the loss of portions of the cluster. The cluster may further provide for fail-over and/or load balancing between cluster members.

Various components (discussed below) of the recovery network 240, such as the data store 243, the alternative path interface 246, the PCN interface 247, the alternative network interface 248, and/or the backup module 249 may comprise redundant components. For example, the PCN interface 247 may be configured to interface with the PCN 220 using a plurality of different connection media, using various different communication protocols, and so on (e.g., via multiple T1 lines, fiber lines, wireless links, network connections, multiple service providers, and so on). Therefore, if one or more of the interfaces is down, other interfaces may be used to maintain communication with the PCN 220. The alternative path interface 246 may include similar redundant connections to each of the one or more alternative communication paths 250 (satellite communication path), 251 (wireless/radio communications path), and/or 253 (fiber optic communication path).

Although not shown in FIG. 2, the recovery network 250 may include and/or be communicatively coupled to other types of alternative communication paths. For example, the alternative communication paths 250-253 may include, but are not limited to: an IP network, such as the Internet; a point-to-point wireless network (such as the radio network 251), a virtual private network (VPN), a MultiProtocol Label Switching network MPLS, a mesh network, a WiMax network (e.g., IEEE 802.16 network), or the like. Therefore, this disclosure should not be read as limited to any particular set of alternative communication paths 250-253.

In some embodiments, the functional modules (e.g., modules 242, 244, 246, 247, 248, and 249) may be implemented (in whole or in part) as respective, distinct software modules embodied on a computer-readable storage medium and operable on one or more of the clustered computing devices 241 of the recovery network 240. Moreover, one or more of the modules may be tied to particular hardware components of the one or more computing devices. For example, the data store 243 may be tied to one or more data storage medium devices (not shown) capable of storing the data structures used by the data store 243. Similarly, the alternative path interface 246, the PCN interface 247, and/or the alternative networks interface 248 may be tied to one or more communications interfaces used to interact with the alternative communication paths 250-253, alternative networks 225, and/or the PCN 220, respectively.

The configuration interface 242 provides an interface whereby an organization may modify and/or control the operation of the recovery network 240. Each organization (not shown) to which the recovery network 240 provides recovery services may have respective configuration information associated therewith. The configuration information may be created and edited via the configuration interface 242. The recovery network 240 may change its operation in real-time according to changes to the configuration information made through the configuration interface 242.

The configuration information of the one or more organizations is stored in a data store 243. The data store 243 is depicted in FIG. 1 as comprising configuration information 245 of a particular organization (not shown). The data store 243 may comprise and/or be communicatively coupled to data storage media, such as, but not limited to: fixed discs, optical media, distributed data storage media, a storage area network (SAN), a redundant array of inexpensive discs (RAID), Flash memory, a database, a directory service, a combination of data storage types, or the like. The data store 243 may be implemented using distributed and/or redundant data storage media to reduce the risk of data loss due to hardware/software faults.

The configuration interface 242 may be accessible via the PCN 220 (e.g., may be accessible via a network, such as the Internet, a phone connection, or the like). The configuration interface 242 may provide for activation/deactivation of the recovery network 240 for a particular organization. As will be discussed below, when the recovery network 240 is activated, communication requests directed to the organization may be processed by the recovery network 240. The processing may include, but is not limited to: servicing the communication request using an alternative communication path (e.g., a satellite network 250); routing the communication request to an alternative location (phone number) within the PCN 220; backing up the communication request; servicing the communication request (e.g., using a phone tree, directory, or other system provided by the recovery network 240); or the like.

A soft switch or functionally similar module 244 is configured to process communication requests according to the configuration information 245 of a particular organization. The term "soft switch" is used to illustrate that the communications pathways connected and/or processing applied by the soft switch 244 may be dynamically set according to configuration information of an organization 245 (e.g., data within the data store 243), which may be updated in real-time. Therefore, the operation of the soft switch module 244 may be modified in real-time according to the contents of the data store 243.

The soft switch module 244 is communicatively coupled to the data store 243 and to the PCN interface 247. The PCN interface 247 (discussed below) is adapted to configure, monitor, and/or interact with the PCN 220. Accordingly, and as discussed above, the PCN interface 247 may include one or more communications interfaces to the PCN 220, such as one or more wireless network connections, PSTN connections, T1 lines, and so on.

When activated, the PCN 220 may be configured to divert (e.g., forward) communication requests intended for the organization to the recovery network 240. As discussed above, this may be done using a number of different mechanisms including, but not limited to:

carrier forwarding by one or more local carriers 222 and/or VoIP providers 228 (local/toll telephone-based communication) within the PCN;

porting one or more phone numbers of the organization to an alternative Local Routing Number (LRN) (e.g., a Central Office (CO)) using a standard number port operation (e.g., via a Local Number Portability (LNP) operation), to configure the PCN 220 (e.g., the local carrier 222, routing database 223, long distance carrier 224, or the like) to forward/divert communication requests to the recovery network 240;

rerouting of communication requests to an alternative LRN by utilizing a secondary routing database 223 within the PCN 220 that sends and monitors communication requests to a number portability service (e.g., the Number Portability Administration Center (NPAC)) to effect a routing change in a database within the PCN 220 (e.g., an LNP database or the like), which then forwards/diverts communication requests to the recovery network 240;

redirecting VoIP traffic intended for the organization into the recovery network 240;

configuring one or more long distance carriers 224 and/or VoIP providers 228 to divert communication requests to the recovery network 240;

using a third-party Responsible Organization (RespOrg) (not shown) to configure the national SMS/800 database 226 to direct incoming toll-free communication requests to the recovery network 240 (e.g., modify one or more carrier assignments within the SMS/800 database 226 to direct requests to a carrier that is configured to direct incoming calls/faxes to the recovery network 240);

directly configuring the national SMS/800 database to direct toll-free communication requests to the recovery network 240 (e.g., directly modify one or more carrier assignments within the national SMS/800 database 226 to direct requests to a carrier that is configured to direct incoming calls/faxes to the recovery network 240);

receiving directly dialed communication requests via a local or toll-free line (e.g., the recovery network 240 may publish one or more access numbers for the organization, which may be accessed via the PCN 220);

rerouting IP communication by modifying host and/or host table information in an IP routing provider 230;

rerouting IP communication at the Domain Name Service (DNS) level by configuring one or more DNS provider(s) 232 to direct IP traffic to the recovery network 240; and the like.

In some embodiments, the reconfiguration/diversion operations described above may be activated manually or automatically using pre-existing capabilities within the PCN 220. In the case of manual activation, personnel of the organization and/or of the recovery network 240 may interact with the PCN 220 to reconfigure the PCN 220 accordingly. In the case of automatic activation, monitoring tools within the PCN 220 may detect a fault condition in the connection between the organization and the PCN 220, which may automatically trigger the diversion of communication requests to a predetermined destination (e.g., the recovery network). Alternatively, or in addition, one or more of the reconfiguration operations described above may be performed programmatically (e.g., using one or more Application Programming Interfaces (API) available within the PCN 220). For instance, in some embodiments, the soft switch 244 (or other component of the recovery network 240) may be configured to access one or more APIs available through the PCN 220 to perform one or more of the reconfiguration operations described above. In addition, the recovery network 240 may include an automated caller system configured to autonomously interact with manual reconfiguration capabilities provided by the PCN 220 (e.g., an automated calling system of the recovery network 240 (not shown) may call into various PCN 220 reconfiguration systems to thereby reconfigure the PCN 220, as described above).

The PCN interface 247 of the recovery network 240 may be further configured to monitor communications within the PCN 220 to detect communication requests intended for the organization and to automatically, dynamically, or autonomously interact with the manual reconfiguration capabilities provided by the PCN 220 (as described above) to divert communication requests to the recovery network 240 for processing.

The recovery network 240 may receive forwarded/diverted communication requests via multiple paths, including, but not limited to:

by one or more local carrier connections (e.g., from one or more local carriers 222);

by one or more long distance carrier connections (e.g., from one or more long distance carriers 224);

by one or more IP connections (e.g., from one or more SIP providers 228);

via IP traffic redirected using the one or more routing providers 230 and/or DNS providers 232; and the like.

Therefore, the PCN interface 247 may include a service request gateway (not shown), such as a SIP gateway, which may receive VoIP communication requests redirected/forwarded from the PCN 220. The PCN interface 246 may process VoIP requests received via the service request gateway (e.g., SIP gateway) using a media server (not shown) and/or VoIP gateway device (not shown). Alternatively, or in addition, the PCN interface 246 may process VoIP communication requests directly using the media server and VoIP gateway (e.g., bypassing the SIP gateway).

The alternative network interface 248 may communicatively couple the recovery network 240 to one or more alternative networks 225, such as emergency services networks, dispatch service networks, citizen networks, or the like. The alternative networks 225 may include one or more RF networks (e.g., Citizen Band (CB) radio, ham radio, emergency dispatch radio, and the like), dedicated wireless networks, dedicated telephone networks, or any other communication infrastructure known in the art. Communication traffic received from an organization (e.g., organization 110 of FIG. 1) via one or more of the alternative communication paths 250, 251, and/or 253 may be forwarded to an alternative network 225 using the alternative network interface 248. Accordingly, the alternative network interface 248 may be configured to convert communication traffic into an appropriate format for one or more of the alternative networks 225. Similarly, the alternative network interface 248 may receive communications directed to the organization from an alternative network 225, convert the communication into an appropriate format, and forward the communication to the organization using one or more alternative communication paths 250, 251, and/or 253. The alternative network interface 248 may include one or more RF transponders, radios, or the like, which may be configured to communicate with the alternative networks 225.

As discussed above, the recovery network 240 may process communication requests forwarded from and/or detected within the PCN 220 and/or alternative networks 225 in a number of different ways. The processing applied by the recovery network 240 may be specified in the configuration information 245 of the organization. In some embodiments, the configuration information may include a set of "recovery rules," which may specify how particular communication requests are to be processed.

FIG. 3A shows one example of a set of recovery rules 300. As seen in FIG. 3A, a set of communication types 310 may be associated with respective processing directives 320. For instance, the recovery rules 300 may specify that communication requests directed to a particular phone number 311 (801-555-1223) be serviced using an alternative communication path (satellite network 321). Another recovery rule 312 may specify that a range of numbers 312 be redirected to another range of numbers 322 within the PCN (e.g., redirect 801-555-134* to 345-555-134*). Similarly, a range of numbers 313 may be serviced using an alternate communication path 323.

The recovery rules may also define handling of IP data. For example, a recovery rule may specify that IP traffic directed to a particular address or range of addresses 314 (168.34.23.*) be serviced on an alternative communication path 324. Similarly, email messages directed to address ranges or particular addresses 315 may be redirected to other locations within a PCN (e.g., to an alternative email address 325 or server).

Other recovery rules may specify conversion of a communication request from a first format to a second format. For example, the recovery rule 316 specifies that voice communication received on a particular phone number (801-555-1225) be sent to an email address 326. The rule 316 may cause the recovery network to convert the voice call into audio and/or text for delivery to the specified email address 326. Similarly, rules may be specified to deliver voicemail, faxes, and other communication alerts over email or other network communication types (e.g., as SMS text messages, instant message, IP data, or the like).

A recovery rule may further specify that particular communications be backed-up for processing at a later time. As will be discussed below, the recovery network (such as recovery network 240) may include a backup service configured to receive and/or record communications data. The rule 317 may specify that communication data (voice, fax, or the like) received on a particular range of numbers (801-555-188*) be backed up 327 by the recovery network. Therefore, as communications data is received on the specified numbers 317, the communication data may not be rerouted to the organization, but may be processed and stored by a backup module within the recovery network. The backed-up communication data may be processed by the organization at a later time (e.g., after normal communications services have been restored). In some embodiments, as soon as communication is backed-up, a notification (such as an email, text message, or the like) may be sent to an entity within the PCN 220 (or other network), indicating that backed-up communications are available for retrieval.

As discussed above, some communication requests may be handled using services provided by the recovery network (recovery network 240). These services may be configured to emulate the operation of the organization's own communication system. For example, the recovery network may provide a dial-by-extension directory service, a dial-by-name directory service, an automated phone tree, uniform call distribution (UCD), automatic call distribution (ACD), hunting, overflow between locations, a recorded messaging system, or the like. One or more recovery rules 310 may specify particular communication requests to be serviced using one or more of these services (provided by the recovery network). For example, the recovery rule 318 specifies that communication requests received on a set of numbers (calls received on 801-555-199*) be processed using an automated calling system 328 (e.g., automated calling system (org, 1)). The automated calling system 328 may be organization-specific, such that the system 328 may be configured to mimic a calling system of the organization (e.g., may use the same prompts, interface, provide the same options, and so on). The automated calling system 328 may be one of several different automated services provided for the organization. For example, in the processing rule 328, the automated calling system is specified as "(org, 1)", which may specify one of several different automated calling systems provided by the recovery network and configured for the organization (e.g., an organization-specific technical support calling system, information calling system, or the like). Additional recovery rules 330 may be provided (not shown) to specify the use of other types of organization-specific services (e.g., dial-by-name directory services, phone tree services, and so on).

The recovery rules 310 may reference one or more alternative networks. In the FIG. 3A example, the recovery rule 319 specifies that communication requests directed to an emergency number (e.g., 911) are to be forwarded on an alternative network (an Emergency Medical Services (EMS) dispatch network) 329. The EMS dispatch network may be an RF network comprising RF communication at a particular frequency and/or channel. Voice communication originating at the organization may be converted into an RF transmission on the EMS dispatch network (at the appropriate frequency and/or channel), and inbound EMS dispatch network traffic may be converted into an appropriate format (e.g., voice telephone) and forwarded to the organization. In this way, the organization may be communicatively coupled to the alternative network (EMS dispatch) using its own communications infrastructure.

In some embodiments, recovery rules may specify multiple, different processing directives for the same types of communication requests. For instance, the recovery rules may provide for servicing an incoming telephone call using the PCN, Internet, an alternative communication path, and so on. The recovery rules may be applied in order, which may be defined by a relative priority assigned thereto. For instance, when a communication request is received, it may be processed according to the highest priority recovery rule and, if the processing is unsuccessful, the communication request may be processed according to the next highest priority recovery rule, and so on. For example, the first, highest priority recovery rule may specify that the communication request be routed directly to the organization via the PCN. If the processing is unsuccessful (e.g., if the PCN is unavailable and/or no one is available to handle the request at the organization), then the second, next highest priority recovery rule may be applied (e.g., the communication request may be routed to the organization over an alternative communication path and/or the Internet). If the second processing is unsuccessful, a third recovery rule may be applied (e.g., that specifies that the communication request is to be forwarded to another entity within the PCN 200), and so on. Some embodiments may include a default recovery rule, which may be used in the event that none of the other recovery rules is capable of successfully processing the request. The default recovery rule may backup the communication request, provide a phone tree, provide a recorded message, or the like.

Although FIG. 3A shows an exemplary set of recovery rules 310 in a particular data format, one skilled in the art would recognize that the teachings of this disclosure could be applied to any set of processing directives (recovery rules), stored in any format (e.g., as one or more database tables, directory entries, XML data, flat files, etc.). Moreover, the recovery rules 310 may be adapted for use according to the nature of the communication services provided by the recovery network. In some embodiments, the recovery rules may include rules specifying particular processes for handling VoIP communication data, voicemail systems, automated phone systems, automated directory systems, and so on. Therefore, this disclosure should not be read as limited to any particular set of recovery rules in any particular recovery rule format.

FIG. 3B provides one example of a set of prioritized recovery rules 330. In the FIG. 3B example, the recovery rules 331, 332, 333, 334, and 335 each apply to an incoming communication request directed to a telephone number (801-555-1223). Each of the recovery rules 330 is assigned a relative priority: the recovery rule 331 has the highest priority (as indicated by the "[1]"), the recovery rule 332 has the second highest priority, and so on. The recovery rule 335 may be a default recovery rule that is assigned a "lowest" priority and applies to all communication requests directed to the organization. Accordingly, the recovery rule 336 may be applied when other applicable recovery rules have failed to successfully process the communication request.

According to the FIG. 3B recovery rules, a communication request directed to 801-555-1223 will first be processed according to the first priority recovery rule 331 (e.g., by attempting to service the request using an alternative communication path, such as the Internet). If the communication request cannot be serviced using the Internet (e.g., if the organization's connection to the Internet is unavailable, overly congested, or the like), the second priority recovery rule 332 may be applied. According to the second priority recovery rule 332, the communication request may be serviced using a satellite network (e.g., satellite network 150 of FIG. 1). If the second priority recovery rule 332 is unsuccessful, the third recovery rule 333 may be applied, which may comprise forwarding the request to another address within the PCN (e.g., to 345-555-1349). If the recovery rule 333 is unsuccessful, the request may be backed-up (according to the fourth priority recovery rule 334), and, if backup is unsuccessful, the default recovery rule 335 may direct the request to an automated calling system for the organization as described above.

In some embodiments, one or more of the recovery rules 331, 332, 333, 334, and/or 335 may further include retry and/or timeout values. A retry value may specify how many times a particular type of processing may be retried before moving on to the next, lower priority recovery rule. For instance, the recovery rule 331 may attempt to connect a communication request via the Internet three times with a pre-determined delay between each attempt before failing over to the next recovery rule (recovery rule 332). By the same token, when the recovery network has detected and/or been informed of a failure in a particular communication path, recovery rules specifying the path may be skipped until the path has been restored. For example, if the Internet connection to the organization is known to be unavailable, the recovery rule 331 may not attempt to service communication requests directed to the organization using the Internet (using recovery rule 331) until the Internet connection is available again.

Although the recovery rules 330 in FIG. 3B are depicted with respective priority values (e.g., [1] through [4]), the disclosure is not limited in this regard. In some embodiments, particular recovery rules 330 and/or processing directives may be automatically assigned a relative priority. For instance, recovery rules providing for immediate servicing of an incoming communication request (e.g., using an alternative communication path) may be preferred over other types of recovery rules. For example, recovery rules that provide for immediate servicing of a communication request by an organization using the organization's communication infrastructure (e.g., by servicing the communication request using an alternative communication path) may have a higher priority that other types of recovery rules. Recovery rules that forward communication requests to other addresses within the PCN may be given the next highest priority (since these rules provide for immediate servicing of the request), and other rules, such as backup, automated phone tree, voice mail, etc., may be given a lower priority, and so on.

Referring back to FIG. 2, the soft switch 244 may be configured to process communication requests forwarded from and/or detected within the PCN 220 according to the configuration data 245 of the organization. Therefore, to determine the appropriate processing (e.g., which recovery rule applies to the communication), the soft switch 244 identifies the organization and/or addresses within the organization to which the communication request was originally directed. This identifying may be performed in a number of different ways. For example, each organization serviced by the recovery network 240 may be assigned one or more recovery network 240-specific addresses (e.g., access numbers). Therefore, for incoming calls/faxes forwarded to the recovery network 240 by a carrier 222/224, the soft switch 244 identifies the organization by the access number on which the calls/faxes were received (e.g., the caller dials (801) 555-1212, which is forwarded by a local carrier 222 to a number (800) 666-7890, which is a recovery network 240 access number assigned to the particular organization). The organization associated with incoming calls/faxes directed to the recovery network 240 by a toll-free carrier 224 may be similarly identified (e.g., identified based on the access number assigned to the organization within the recovery network 240) or by pre-loading the organization's toll-free number(s) into the recovery network and associating them with the organization, then identifying the toll-free number dialed by the caller as the call is received by the recovery network 240. Alternatively, or in addition, different organizations may share the same access number within the recovery network 240 and may be distinguished using an extension or other qualifier appended thereto during forwarding by the local carrier 222, long distance carrier 244, or the like.

The organization associated with IP traffic may be identified according to routing and/or naming information available within the communication request. The routing information may be appended to an IP header on IP packets or other message types. Alternatively, or in addition, the recovery network 240 may include plural, different access addresses (e.g., IP addresses) to which IP traffic may be forwarded/redirected. As such, the soft switch 244 may identify the organization associated with IP data based upon the address within the recovery network 240 on which the data was received. Similarly, where IP data is routed to the recovery network 240 due to a modification of an address mapping in a DNS provider 232, the organization may be identified based upon the naming information within the data (e.g., domain host name within the IP data, such as www.organization.com, person@organization.com, or the like).

After determining the organization associated with the communication request, the recovery network 240 may be further configured to identify the original destination address (e.g., particular phone number) within the organization. As discussed above, an organization may provide plural different access addresses (e.g., phone numbers) through which entities may contact the organization. For example, the organization may have addresses (phone numbers) dedicated to providing different types of services, such as customer support, new sales, providing critical technical support, providing warranty information, providing general information about the organization, and so on. When active, the recovery network 240 may configure the PCN 220 to forward communication requests directed to each of these addresses to a single number assigned to the organization within the recovery network 240. However, the recovery network 240 may require the organization-specific number associated with forwarded/redirected communication requests to handle the requests accordingly (according to the configuration information 245 of the organization). For instance, the organization's configuration information may specify that requests directed to a "general information" number be forwarded to a recorded message and/or an automated phone tree, whereas requests directed to a critical technical support number may be routed to the organization using an alternative communication path 250-253 and/or to another location within the PCN 220 (e.g., a cellular telephone, a phone system at another location of the organization, or the like).

The recovery network 240 may be configured to identify an organization-specific address in a number of different ways, including, but not limited to:

configuring the PCN 220 (e.g., the local carriers 222, long-distance carriers 224, VoIP providers 228, and the like) to provide Originally Called Number (OCN) information with the forwarded/diverted requests, the OCN information may identify the organization-specific address of the communication request;

configuring the PCN 220 (e.g., the local carriers 222, long-distance carriers 224, VoIP providers 228, and the like) to provide Re-directed Number Identification Service (RDNIS) information with the forwarded/diverted requests, the RDNIS information may identify the organization-specific address of the communication request;

prompting the caller to use DTMF tones to input the address (phone number) they originally dialed;

configuring the VoIP providers 228 to include diversion headers (e.g., Session Initiation Protocol (SIP) diversion headers) within forwarded/diverted requests, the diversion header (e.g., SIP diversion header) may identify the organization-specific address of the communication request;

examining IP header and/or IP addressing data within network data (e.g., HTTP requests, email messages, and so on); and the like.

Upon identifying an organization and/or organization-specific address of the communication request, the soft switch 244 may process the request according to the configuration information 245 (e.g., recovery rules) of the organization. As described above, the recovery rules established by an organization may be configured to mimic the organization's existing communication system. Therefore, even during an outage condition, the organization may seamlessly communicate with its customers. In addition, the recovery rules may be reconfigured (via the configuration interface 242) in real-time, to allow the organization to adapt to changing conditions. Furthermore, the configuration information 245 may include predefined and/or sets of predefined recovery plans, each of which may be readily available for activation as needed. This may allow the organizations to respond quickly to outage conditions to thereby reduce or even eliminate communications service interruptions.

As discussed above, a recovery rule may specify that one or more communication requests be redirected to alternative addresses within the PCN 220. The soft switch 244 may be configured to redirect communication requests in a number of different locations/devices within the PCN 220 including, but not limited to: an alternative provider, such as a provider 222, 224, 228, or the like, a landline, a mobile phone, an IP phone, a hand-held satellite phone, a radio system, a voicemail system, a phone tree, an IP address, a network server (e.g., email server), a directory service, or the like. The redirection may be performed using any other data routing mechanism and/or technique available within the PCN 220 (e.g., available via the local carrier 222, long-distance carrier 224, SMS/800 provider 226, VoIP provider 228, IP routing provider 230, DNS provider 232, or the like).

As discussed above, the configuration information 245 may also define other communication interfaces (phone trees, directories, and the like) to allow the recovery network 240 to emulate the operation of the organization's communication system. For example, the organization may include a phone tree, dial-by-name directory, dial-by-extension directory, one or more automated attendants, music while on hold, and the like. The recovery network 240 may be configured provide these services in a way that emulates the operation of the organization's communication system. For example, the recovery network 240 may include a dual-tone multi-frequency (DTMF) interface, a text-to-speech interface, or other interface by which various services may be made available (e.g., a dial-by-directory service, an automated attendant, and other services). The organization may provide configuration information 245 (e.g., via the configuration interface 246), which may configure the recovery network 240 to emulate the operation of the organization's services (e.g., provide the same dial-by-name directory, extension directory, music on hold, and so on). Recovery rules may be defined to process user selections within the various dial-by-name, phone tree, and/or automated calling system interfaces. In addition, the configuration information 245 may include voice recordings and other messages provided by the organization to allow the recovery network 240 to closely emulate organization's communication system (e.g., provide callers with same voice prompts used by the organization, the same music, and so on).

The configuration data 245 of the organization may specify that particular communication requests be serviced by one or more alternative communication paths 250-253. As shown in FIG. 2, in some embodiments, the recovery network 240 may include and/or be communicatively coupled to a plurality of different alternative communication paths 250-253. For instance, the recovery network 240 is coupled to a satellite network 250 (similar to the satellite network 150 shown and described in FIG. 1), a radio transmission communication path 251, and a fiber optic communication path 253. The alternative communication path module 246 is configured to interact with each of the alternative communication paths 250-253 to allow the soft switch 244 to redirect and/or service communications using one or more of the paths 250-253 as required. In alternative embodiments, such as system 100 of FIG. 1, the recovery network 240 may include a single alternative communication path (e.g., satellite network 150), or other alternative communication paths, in addition to those depicted in FIG. 2. One or more of the alternative communication paths 250-253 may be dedicated to servicing a particular organization. Alternatively, or in addition, other alternative communication paths 250-253 may be shared between a set of organizations and/or all of the organizations serviced by the recovery network 240.

For example, during a PCN 220 outage, the configuration information 245 of the organization may specify that certain communications (e.g., calls to particular telephone numbers, network traffic directed to particular addresses, etc.) be serviced using the satellite network 250 when the PCN 220 is not available.

Referring back to FIG. 1, the organization 110 may have installed a satellite interface 116 adapted to receive and/or transmit communication requests over a satellite network 150. The satellite interface 116 may couple the organization's communication system 112 to the satellite network using a gateway (e.g., gateway 118). The gateway 118 may perform various data routing and conversion tasks. For instance, the gateway 118 may decompress, decrypt, and/or format communication data (e.g., voice, IP, and the like) for use by the organization's communication system (e.g., PBX 113). Similarly, the gateway 118 may identify and process IP traffic for use by the computing devices 115, which may include a web server, email server, personal computing devices, and the like. Therefore, the satellite network 150 may allow the recovery network 140 to seamlessly provide communications services to the organization 110 using the organization's 110 existing communication system 112.

The alternative path interface 246 may include similar components. For example, the alternative path interface may include a gateway/multiplexer (not shown) to perform data conversions so that incoming communication requests in a first format (e.g., TDM) may be transmitted in a second format (e.g., SIP) over the satellite network 250 and then converted back into the first or another format for use by the organization's communication system 112. In addition, gateway and/or other hardware components (e.g., a VoIP gateway (not shown)) may compress/decompress communications data as required to traverse the satellite network 250 or alternative communications paths. Direct VoIP (e.g., SIP and/or H.323) communication requests may be sent and received directly by a properly configured communication system 112 of the organization (e.g., PBX 113). If the organization's communication system 112 is unable to process direct VoIP, the organization may include a VoIP client to process the communication requests.

In addition, one or more computing devices (not shown) may be provided for converting between VoIP (e.g., SIP) and TDM (e.g., PRI/ISDN) formatted communications. For instance, communication data in PRI/ISDN format may be converted to SIP for processing by the recovery network 240 (e.g., by the soft switch 244 and the like) and into PRI/ISDN for use by/within the PCN 220.

FIG. 2 shows other examples of other alternative communication paths. For instance, a radio network 251 may be provided, which may include one or more wireless networks, one or more point-to-point RF networks, or the like. Organizations may be communicatively coupled to the radio network 251 using respective radio interfaces (not shown), which may comprise a radio receiver/transmitter and/or a radio gateway (not shown). As described above in the satellite network example, the radio gateway may allow communications data to be consumed by an organization's existing communication system (e.g., system 112 of FIG. 1). Similarly, the recovery network 240, and specifically the alternative path interface 246, may include integration hardware (e.g., gateway, multiplexer, converters, etc.) to integrate the PCN 220 with the various data formats used on the alternative paths 251-253. One skilled in the art would recognize any communication network or communication path could be used as an alternative communication path 250-253 under the teachings of this disclosure. Therefore, this disclosure should not be read as limited to any particular type of communication network and/or to any particular network infrastructure.

The soft switch 244 may provide redundant communications services for an organization. As discussed above, an organization may provide various different interfaces by which external entities (callers) may interact with the organization. For example, the organization may provide a phone tree, dial-by-name directory, dial-by-extension directory, one or more automated attendants, call distribution queues, hold music, fax services, and the like. The recovery network 240 may provide an equivalent set of services for the organization via the soft switch 244. The configuration data 245 of the organization may configure the soft switch 244 to emulate the operation of the organization's services (e.g., provide an equivalent dial-by-name directory, provide the same set of prompts and/or information in a phone tree, and so on). As will be discussed below, one or more recovery rules of the organization (stored in the configuration data 245) may specify that particular types of communication requests (e.g., calls to particular numbers) be handled using one or more of the services provided by the soft switch 244 (e.g., may specify that all calls received on a particular number be serviced by the soft switch 244, which may be configured to provide the caller with a dial-by-name directory service configured to emulate the organization's directory, and so on).

The recovery network 240 may further include a backup module 249, which may include and/or be communicatively coupled to a data storage media (e.g., data storage media 243), and the PCN interface 247. When active, the backup module 249 may store (e.g., backup) communication requests (e.g., calls and faxes) directed to the organization. As discussed above, one or more recovery rules of an organization may route certain types of communication requests directly to backup and/or attempt multiple alternative communication paths before handling by the backup module 249. Backed-up communication requests may be converted into a data/text format for later delivery. In addition, the backup module 249 may be used to backup communication requests directed to an organization until one or more alternative communication paths 250-253 become available.

For example, in certain outage conditions, an organization may be cut off from the alternative communication paths 250-253 and/or alternative addresses within the PCN 220 for some time (e.g., while a connection is being established/negotiated, while the alternative addresses (satellite phones) are initialized, and so on). While alternative communication paths are intermittently or completely unavailable, communication requests directed to the organization may be handled directly by the backup module 249, or by first attempting multiple alternative communication paths (according to the recovery rules) before handling by the backup module 249, which may backup communication data for delivery to the organization at a later time. Therefore, the backup module 249 may include means for receiving and storing communication data including, but not limited to: a data storage media, a voice call recording system, a voicemail system (e.g., to receive voice communications), a phone tree, an automated call receiving system, a fax receiver, an email server, an IP proxy, an IP cache, or the like.

As the organization's alternative communication paths 250-253 and/or alternative addresses within the PCN 220 are available, the communication data may be delivered thereto.

In some embodiments the backup module 249 may be configured to automatically transmit backed up communications data to the organization when alternative communication means become available (e.g., push the backed-up data to the organization). Alternatively, or in addition, the recovery network 240 may issue an alert to the organization indicating that backed up communication data is available. The organization may access the backed-up data as it desires (e.g., pull backed-up data from the recovery network 240).

Figure 4:
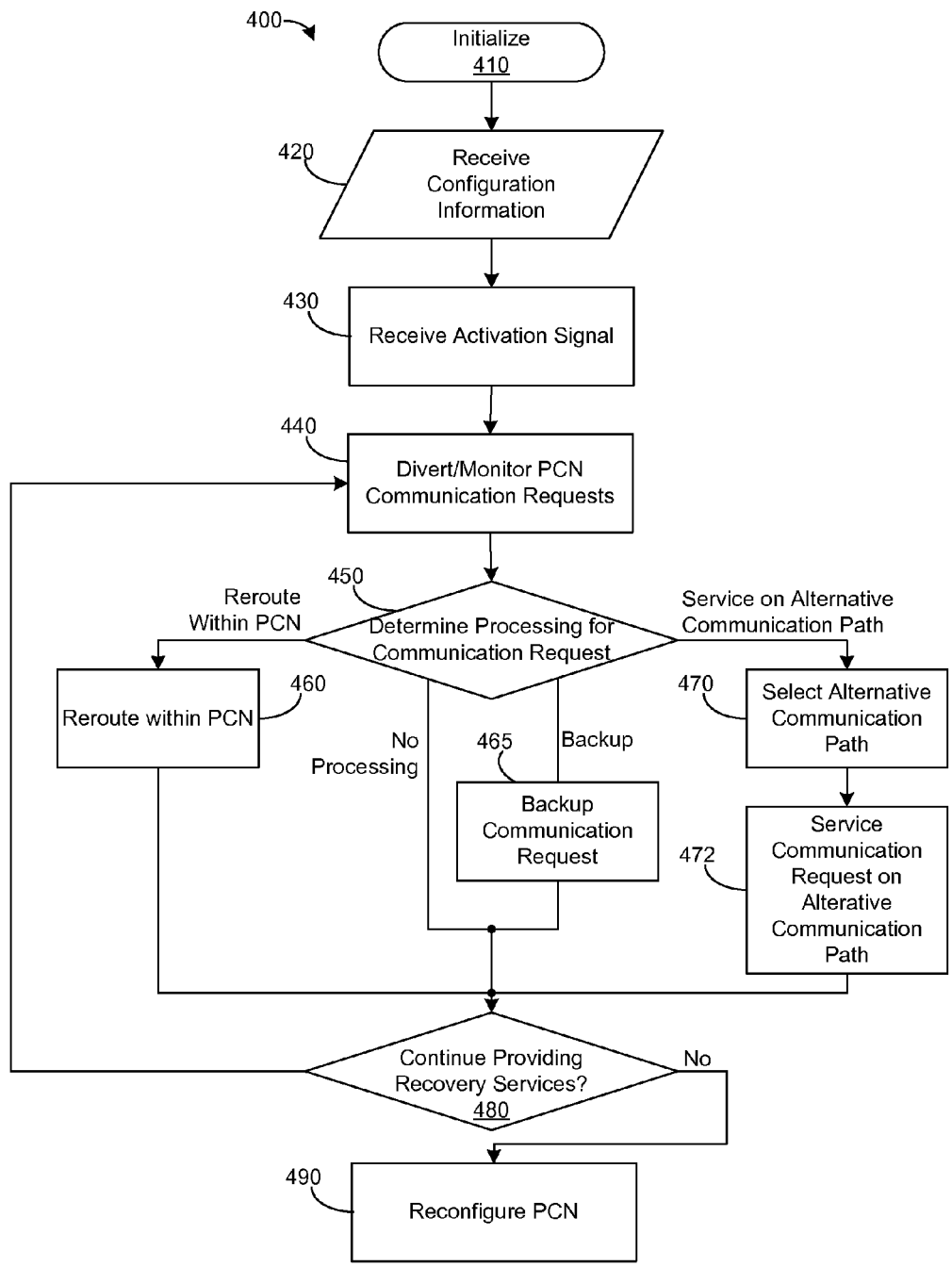
FIG. 4 is a flow diagram of a method for providing recovery and backup services.

FIG. 4 is a flow diagram of one embodiment of a method 400 for providing recovery and backup services. At step 410, the method 400 may be initialized, which may include allocating resources for the method 400, initializing one or more communications interfaces (e.g., to a PCN, alternative communication path, or the like), accessing one or more data stores, and so on.

At step 420, the method may receive configuration information from an organization (e.g., from personnel of the organization). The configuration information may be received via a configuration interface, such as the configuration interface 242 discussed above. The configuration interface may be accessible via the PCN as a phone tree, a website, a human assistant, or other interface. Alternatively, or in addition, the configuration interface may be accessible via one or more alternative communication paths of the recovery network (e.g., a satellite network, a radio network, or the like).

The configuration information received at step 420 may include one or more recovery rules to specify how particular types of communication data are to be processed when recovery services are activated. For example, the recovery rules may specify that voice calls received on a particular set of access numbers (e.g., phone numbers) be routed to other phone numbers within the PCN. Alternatively, or in addition, the configuration information may specify that calls to specified access numbers should be routed directly to the organization using a selected alternative communication path (e.g., a satellite network).

As discussed above, the configuration information (and recovery rules) may include one or more predefined recovery plans, each of which may be created, modified, and/or activated in real-time. Accordingly, changes to the configuration information may modify the behavior of the method 400 as they are applied and/or activated. Therefore, although FIG. 4 shows receiving configuration information as a single step 420, the method 400 may receive configuration information at any time throughout the operation of the method 400. This real-time modification may allow an organization to respond quickly to various outage and/or emergency conditions to thereby reduce or eliminate disruptions to the organization's communication systems.

Although method 400 discusses real-time changes to configuration information, other embodiments in which changes are not applied until approved (e.g., by administrators of the method 400, other personnel authorized by the organization, or the like) could be used under the teachings of this disclosure.

At step 430, the method 400 may await a signal to provide recovery services for an organization. The activation signal may be received via an update to the configuration information of the organization and/or may be received via another source, such as an alternative communication path, an alarm, a call to the method 400, manual entry, or the like. Alternatively, or in addition, step 430 may further comprise monitoring the status of the organization's connection to the PCN. The monitoring of step 430 may include, but is not limited to: periodically pinging the organization to determine whether the communication systems of the organization are operating properly (e.g., dialing into one or more phone numbers of the organization, transmitting IP traffic to the organization, and so on); receiving periodic pings from the organization (e.g., receiving incoming calls, IP traffic, and the like from within the organization); directly monitoring the organization's communication equipment (e.g., via an IP connection, a secure IP connection, a VPN, connection, or the like); or the like. Upon detecting an interruption in the organization's communication system, the method 400 may automatically activate recovery services. Similarly, the method 400 may monitor emergency services within the area of the organization. If particular emergency services are activated (e.g., power recovery, fire, alarm, etc.), the method 400 may be configured to activate one or more portions of the recovery services for the organization (e.g., activate hotline forwarding, a redundant alternative communication path, or the like). In embodiments where the organization's configuration information includes a plurality of different recovery plans, the activation signal of step 430 may specify a particular recovery plan to activate.

In other embodiments, the method 400 may not require an activation signal. For example, the recovery services provided via the method 400 may be "always on" and available to processing communication requests routed from the PCN. Therefore, the "activation" of the method 400 may consist in configuring the PCN to automatically divert communication requests to the method 400 (as discussed below at step 440) upon the detection of a fault condition or by manual diversion using various mechanisms available within the PCN.

At step 440, recovery services may be activated. The activation of step 440 may include configuring the PCN to redirect/forward communication requests directed to the organization to the recovery network (method 400). The addresses to redirect/forward (phone, fax, IP, etc.) as well as respective destination locations (within the recovery network or PCN) may be specified in the configuration information. As discussed above, the redirection of step 440 may be performed using various different mechanisms. The activation of step 440 may include the activation examples discussed above in conjunction with FIG. 2. These mechanisms may include, but are not limited to:

carrier forwarding by one or more local carriers and/or VoIP providers (local/toll telephone-based communication) within the PCN;
porting one or more phone numbers of the organization to an alternative LRN (e.g., a CO) using a standard number port operation (e.g . . . , via a LNP operation), to configure the PCN (e.g., local carrier, long distance carrier, and so on) to forward/divert communication requests to the method 400;
rerouting of communication requests to an alternative LRN by utilizing a secondary routing database within the PCN that sends and monitors communication requests to a portability service (e.g., the NPAC) to effect a routing change in an LNP database or the like within the PCN, which then forwards/diverts communication requests to the recovery network;
redirecting VoIP traffic intended for the organization into the method 400;
configuring one or more long distance carriers and/or VoIP providers to divert communication requests to the method 400;
using a third-party Responsible Organization (RespOrg) to configure the national SMS/800 database to direct incoming toll-free communication requests to the method 400 (e.g., modify one or more carrier assignments within the SMS/800 database to direct requests to a carrier that is configured to direct incoming calls/faxes to the method 400);
directly configuring the SMS/800 database to direct toll-free communication requests to the method 400 (e.g., directly modify one or more carrier assignments within the SMS/800 database to direct requests to a carrier that is configured to direct incoming calls/faxes to the method 400);
receiving directly dialed communication requests on a local or toll-free line (e.g., the method 400 may publish one or more access numbers for the organization, which may be accessed via the PCN);
rerouting IP communication by modifying host and/or host table information in an IP routing database;
rerouting IP communication at the Domain Name Service (DNS) level by configuring one or more DNS providers to direct IP traffic to the method 400; and the like.

As discussed above, PCN configuration of step 440 may be performed manually (e.g., by one or more human operators) and/or may be performed substantially autonomously using interfaces exposed by the PCN (e.g., using automated calling systems, APIs exposed by the PCN, or the like).

The activation of step 440 may further include monitoring communication requests directed to the organization within the PCN. As discussed above, the monitoring of step 440 may include, but is not limited to: monitoring the PCN for incoming calls and/or faxes originating from a local phone carrier and/or long distance carrier directed to the organization; monitoring the PCN for VoIP communication requests (e.g., requests transmitted by a SIP provider/carrier); monitoring IP traffic on the PCN for network data directed to the organization (e.g., HTTP requests, email messages, instant messaging, voice data, and so on); and the like.

At step 450, a communication request may be detected and/or forwarded to the method 400 from the PCN. Responsive to receiving the communication request, the method 400 may access a recovery rule associated with the communication request in the organization's configuration information. At step 450, an organization-specific address of the communication may be detected (e.g., using OCN/RDNIS information, a diversion header (e.g., SIP diversion header), IP routing information, host name information, or the like).

Upon determining the organization and/or organization-specific address of the request, the method 400 may process the communication request according to an active recovery rule associated with the request in the organization's configuration information, and/or determine the appropriate recovery rule based upon one or more caller selections. As discussed above, a recovery rule may specify various different processing mechanisms including, but not limited to: redirecting the communication request to another location and/or address within the PCN; servicing the communication request (e.g., using a phone tree, directory, or other service provided by the method 400); backing up the communication request; transmitting the communication request to the organization using a selected alternative communication path; allowing the PCN to operate normally (e.g., allowing the PCN to handle the communication request); or the like.

The determining of step 450 may include evaluating one or more service limits associated with the organization. For example, an organization may be allotted a communication request-processing threshold, a bandwidth cap on one or more alternative communication paths, a storage limit on a backup service, or the like. At step 450, these service limits may be evaluated to determine one or more of these limits have been reached. If so, the method 400 may modify the processing of the communication request. For example, if an organization has exceeded an alternative communication bandwidth cap, a communication request, which normally would be serviced using an alternative communication path, may be routed to a backup service. Similarly, if an organization has exceeded its backup storage limit, communication requests, which would normally be backed up, may be routed to an automated processing system (e.g., a pre-recorded message).

If at step 450, it is determined that the communication request is to be redirected to an alternative address within the PCN, the flow may continue at step 460. If it is determined that the communication request is to be backed up, the flow may continue at step 465. If it is determined that the communication request is to be transmitted to the organization using an alternative communication path, the flow may continue at step 470; otherwise, if is determined that the communication request should not be processed, the flow may continue at step 480.

At step 460, the communication request may be redirected to another address within the PCN, as indicated by the recovery rule associated therewith. The communication request may be routed to any address/device coupled to the PCN including, but not limited to: a landline phone, a mobile phone, an IP based phone, a satellite phone, a voicemail system, a phone tree, an automated phone system, a fax machine, a call center, or the like. After redirecting the communication request, the flow may continue at step 480.

At step 465, the communication request may be directed to a backup service (e.g., such as the backup module 249 of FIG. 2). The backup of step 465 may include receiving and/or converting the communication request into a format capable of being stored in a data storage media and subsequently delivered to the organization via an alternate communications path, such as email. For example, a voice call may be converted into an audio message, received by a voicemail system, directed to an automated calling system for backup, or the like. A copy of the audio message may then be immediately sent to the organization via an alternate communications path, such as an email with the message attached. Fax data may be similarly received, stored, and optionally delivered over an alternate path. IP data, such as email message, instant message, and the like, may be backed up using an IP proxy, caching device, or the like.

Alternatively, or in addition, the backup of step 465 may include playing back a recorded message (or other data). The playback of step 465 may not allow a caller to leave a message for the organization. Therefore, the playback mechanism may be used where a storage limit for the organization has been reached. The playback message may be provided by the organization and/or may include information provided by the method 400. Following the backup of step 465, the flow may continue to step 480.

At step 470, an alternative communication path for the communication request may be determined. In some embodiments, the organization's configuration information may specify one of more alternative communication paths supported by the organization (e.g., may indicate that the organization is coupled to the method 400 via a satellite network, a radio network, and so on). Alternatively, or in addition, the recovery rules associated with the communication may specify a particular alternative communication path to use to service some or all communication requests.

In some embodiments, the method 400 may monitor the status of one or more of the alternative communication paths. The status information may include a load level of the alternative communication path, a link status of particular organizations on the communication path, and the like. The path selection of step 470 may use the status information in dynamically selecting an appropriate alternative communication path (e.g., may select a path to which the organization is connected, has an acceptable load level, and the like), or step 470 may attempt communication via multiple alternative communication paths while callers wait in queue, or the like.

At step 472, the communication request may be serviced on the selected alternative communication path. As discussed above, the communication system of the organization may be communicatively coupled to the alternative communication path, such that the communication request may be serviced seamlessly over the alternative path (e.g., communications may be received and handled at the organization as if the communication request were being serviced by the PCN). In addition, the method 400 may include and/or be communicatively coupled to integration components (e.g., the alternative path interface 246 or FIG. 2 and/or the satellite interface 116 and gateway 118 of FIG. 1) that allow the method 400 to seamlessly transmit PCN data over the alternative communication path. After establishing the connection and/or servicing the request using the identified alternative communication path, the flow may continue at step 480.

Although not shown in FIG. 4, the processing determined at step 450 may additionally include converting the communication request from a first format into a second format (e.g., as discussed above in conjunction with rule 316 of FIG. 3A). For example, voice call data may be converted into an audio file for backup at step 465, for transmission within the PCN as an email message at step 460, or the like. Similarly, communications may be converted for transmission on an alternative network, such as an EMS radio dispatch network, or the like. Various examples of recovery rules specifying various conversions and/or processing directives are provided above in conjunction with FIG. 3A (e.g., recovery rules 316 and 319 of FIG. 3A).

At step 480, the method 400 may determine whether recovery services (e.g., the method 400) should continue. The determining of step 480 may include inspecting the configuration data of the organization to determine whether recovery services have been deactivated, whether a deactivation signal has been received, whether the configuration data has been changed, and so on. If recovery services are to continue, the flow may return to step 440, where a next communication request may be processed; otherwise, the flow may continue at step 490. At step 490, the method 400 may reconfigure the PCN to route communication requests directly to the organization (e.g., undo portions of the PCN configuration applied at step 440).

Figure 5:
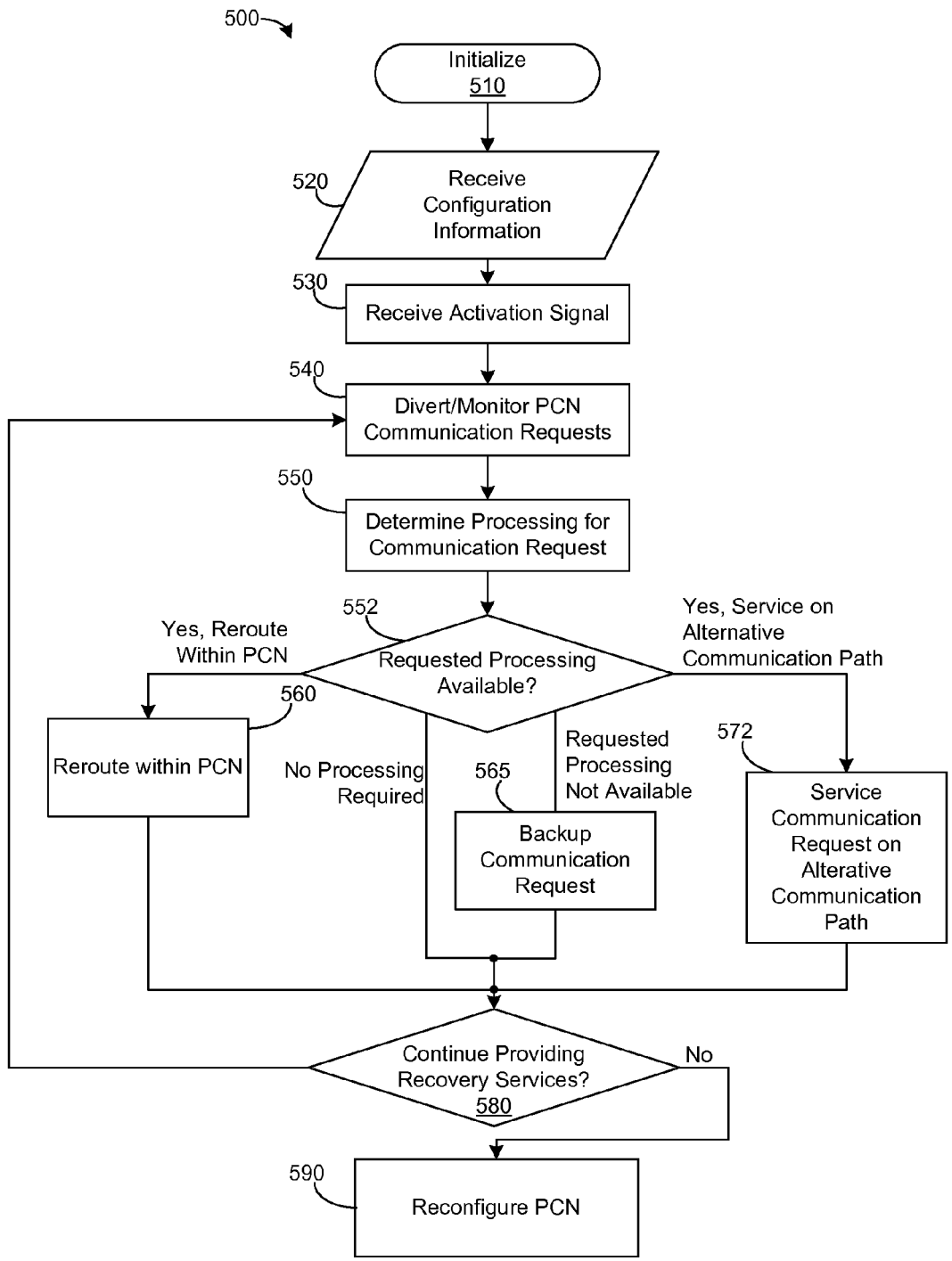
FIG. 5 is a flow diagram of another method for providing recovery and backup services.

FIG. 5 is another embodiment of a method 500 for providing recovery and backup services. As will be discussed below, the method 500 may dynamically determine which communications services are available to the organization (e.g., determine the status of the organization's connection to one or more alternative communication paths, the status of one or more of the organization's alternative addresses within the PCN, and so on), and process communication requests accordingly.

At steps 510-540, the method 500 may be initialized, receive configuration information from the organization, receive an activation signal, and configure a PCN to divert/forward communications to the method 500, as described above.

At step 550, a communication request may be received and a recovery rule (processing directive) associated therewith may be identified as described above. The processing of the communication request may be determined by accessing a recovery rule of the organization. As discussed above, a communication request may be processed in a number of different ways including, but not limited to: rerouting the communication request to a specified address within the PCN (step 560), backing up the communication request (step 565), servicing the communication request using an alternative communication path (step 572), allowing the PCN to route the communication request, and so on.

At step 520, the method 500 may determine whether the processing determined for the communication request is available. The determining of step 552 may depend upon the nature of the processing identified at step 550. For example, if alternative routing within the PCN is to be performed (e.g., at step 560), the determining at step 552 may include determining whether the alternative address is available (e.g., whether a forwarding phone number to which the request would be routed is active), whether the method 500 is capable of reaching the specified address through the PCN, or the like. If the communication request is to be serviced using an alternative communication path, the determining may include determining whether one or more acceptable alternative communication paths are available (e.g., whether the organization is currently linked to the method 500 using one or more of the alternative communication paths). In addition, the determining may include evaluating one or more service limits (e.g., bandwidth caps, storage thresholds, etc.) of the organization. If the requested processing type is available, the flow may continue as specified at step 550 (e.g., to the reroute step of 560, the alternative communication path of step 572, and so on). If the requested processing type is not available, the flow may continue at step 565.

At step 565, the communication request may be backed up. As discussed above, backing up a communication request may include receiving and/or converting the communication request from a first format into a second, storage format (e.g., convert a voice call into an audio file, a text document, or the like). The backed up communication request may be made available to the organization upon establishing an acceptable alternative communication path and/or reestablishing service with the PCN. Alternatively, or in addition, the backup of step 565 may include prompting a caller to provide a callback number. The callback number may be automatically called by the method 500 (e.g., by the recovery network 140 and/or 250 discussed above) when the communications services are restored, and the caller may be connected live to the organization via a concurrent or sequential call to the organization via any available communications path (e.g., the satellite network, PCN, etc.).

Following the backup of step 565 (or the processing at step 560, 572), the flow continues at step 580. As described above, at step 580, the method 500 determines whether recovery services should continue. If the method 500 is to continue providing recovery services, the flow continues to step 540; otherwise, the flow continues to step 590.

Figure 6:
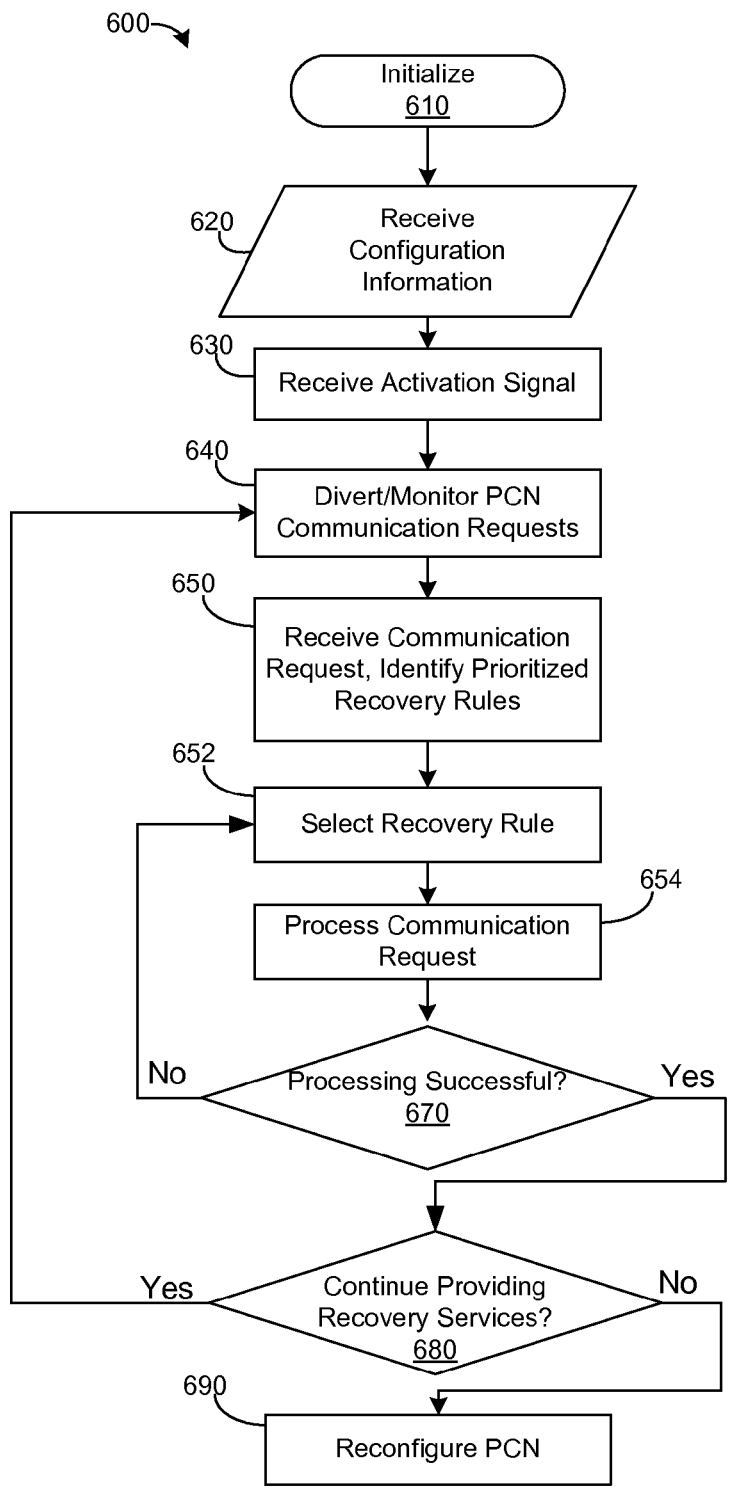
FIG. 6 is a flow diagram of another method for providing recovery and backup services.

FIG. 6 is a flow diagram of another embodiment of a method 600 for providing recovery and backup services.

At steps 610-640, the method 600 may be initialized, receive configuration information, receive an activation signal, and configure a PCN to divert/forward communications to the method 600 as described above.

At step 650, an incoming communication request (from an entity within the PCN or other network) directed to the organization may be received. Step 650 may further comprise identifying a plurality of prioritized recovery rules associated with the communication request (e.g., in a data structure, such as the data structures 310 depicted in FIGS. 3A and/or 3B). The recovery rules may each specify how the communication request is to be processed and may include different, relative priorities. High priority recovery rules may be implemented before low priority rules (e.g., a lower priority recovery rule may only be implemented if the communication request cannot be successfully serviced using higher priority recovery rules).

At step 652, one of the plurality of recovery rules may be selected. The selection may be based upon the relative priority of the recovery rules. (A rule having a higher priority may be selected before a rule having a lower priority.) In some embodiments, the selection of step 652 may further comprise determining the availability and/or load on one or more alternative communication paths. For example, if the alternative communication path specified by a higher priority recovery rule is overloaded and/or unavailable, it may be skipped and another, lower-priority recovery rule may be used in its place.

Alternatively, or in addition, a user (or other entity) may manually specify how the communication request is to be handled. For example, if the communication request is a telephone call, the caller may be given the option of selecting which processing method should be used to handle the call (e.g., using a phone tree or other selection mechanism). If a processing method selected by the user is unsuccessful (e.g., as determined at step 670 below), the user may be given the opportunity to select a different processing method and/or allow the method 600 to select an appropriate processing method as described above.

At step 654, the communication request may be processed according to the selected recovery rule as described above in conjunction with steps 460, 465, 470, and/or 472 of FIG. 4 and/or steps 560, 565, and/or 572 of FIG. 5.

At step 670, the method 600 may determine whether the processing of step 654 was successful (e.g., whether the communication request was connected or otherwise serviced). If the processing was successful (the telephone call was connected to a live person at the organization using an alternative communication path), the flow may continue at step 680; otherwise, the flow may return to step 654 where another processing method may be selected as described above (e.g., the next highest priority recovery rule may be selected and/or the originator of the communication request may select another processing option).

At step 680, if the method 600 is to continue providing recovery and backup services, the flow may return to step 640 to process a next communication request; otherwise, the flow may continue to step 690 where the PCN may be reconfigured as described above.

Figure 7A:
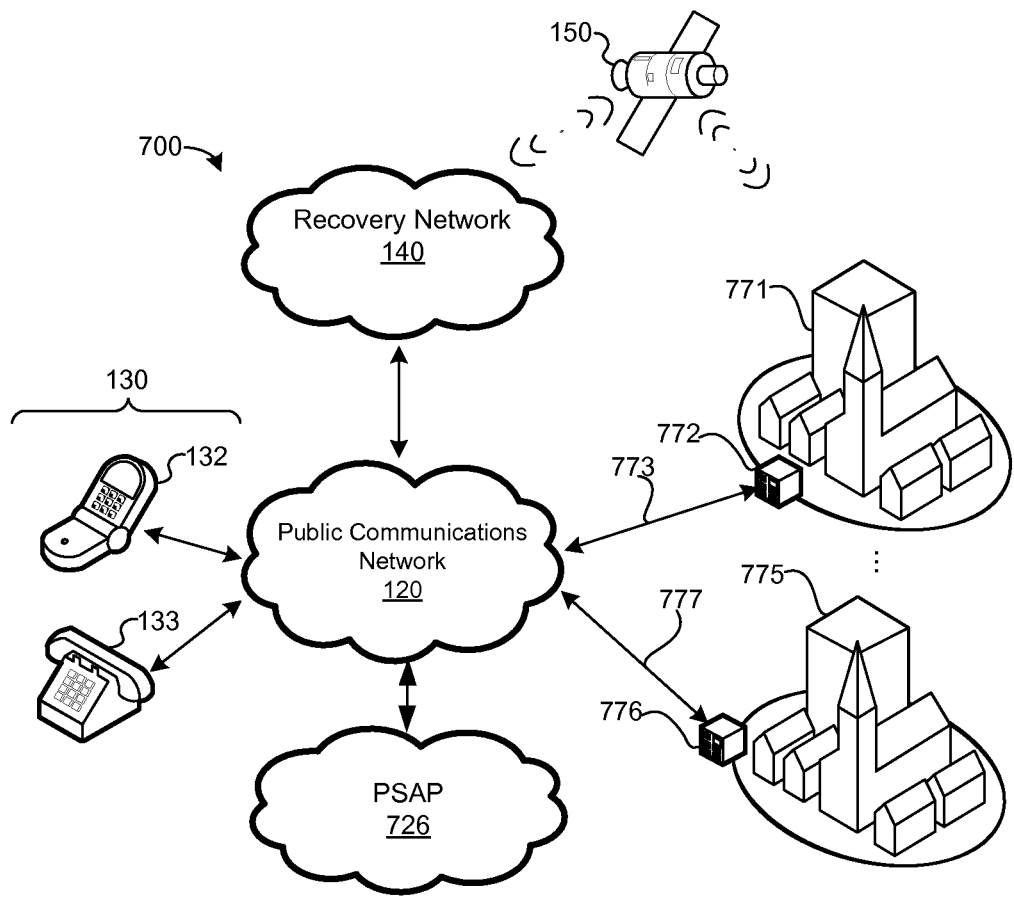
FIG. 7A is a block diagram of one embodiment of a system for providing communications recovery services for a municipality.

FIG. 7A depicts one embodiment of a system 700 for providing seamless recovery and/or backup services for a local carrier having a service area, which may comprise a municipality, township, neighborhood, or the like. In the FIG. 7A example, a first municipality 771 may include a first local carrier 772, which is communicatively coupled to a PCN 120 via a first connection 773 (e.g., a backhaul connection). A second municipality 775 may be similarly configured and may comprise a second local carrier 776 and second connection 777 to the PCN 120. Although in FIG. 7A the local carriers 772 and 776 are represented as separate from the PCN 120, it would be understood by one of skill in the art that the local carriers 772 and 776 could be considered to form part of the PCN 120. The local carriers 772 and 776 are depicted separately in FIG. 7A, in order to illustrate certain features of the recovery network 140 disclosed herein. Moreover, although FIG. 7A describes municipalities 771 and 775, each comprising respective local carriers 772 and 776, the disclosure may encompass any organization (e.g., city, state, region, etc.) serviced by any type of local carrier.

The first municipality 771 and/or the second municipality 775 may rely on a shared Public Safety Answering Point (PSAP) 726, which may be accessible via the PCN 120. The PSAP 726 may provide emergency answering and dispatch services to the municipalities 771 and/or 775, such as 911 services and the like. Alternatively, or in addition, the PSAP 726 may provide information services (e.g., 211 services, or the like). In some embodiments, the first and second municipalities 771 and/or 775 may share the same PSAP 726. For instance, the first and second municipalities 771 and 775 may be too small to warrant their own PSAP service and, as such, may share the PSAP 726 with one or more neighboring municipalities. Although the example of FIG. 7A includes a PSAP 726, the disclosure is not limited in this regard and could be extended to include any shared service known in the art (e.g., shared medical dispatch and information services, shared public safety information service, and so on).

The first local carrier 772 may provide communication services (e.g., phone service) to entities (not shown) within its service area (e.g., entities within the first municipality 771). Communication requests, such as telephone and/or cellular calls originating within the first municipality 771 (e.g., in the service area of the first local carrier 772) may be received and serviced at the first local carrier 772 using switching and other equipment therein. In some embodiments, communication requests to/from entities within the service area of the same local carrier (e.g., local carrier 772 or 776) may be serviced independently of the PCN 120 and/or the connections 773 or 777 thereto. Communication requests to/from entities outside of the service area of the same local carrier (e.g., entities 130, or the PSAP 726) may be serviced using the PCN 120. Accordingly, when the connection 773 of the first local carrier 772 goes down, the first municipality 771 may be isolated from the PCN 120. When so isolated, communication requests within the service area of the first local carrier 772 may continue to be serviced, but communication requests to/from entities outside of the service area of the first local carrier 772, including requests to/from the PSAP 726, may be unavailable. The second local carrier 776 of the second municipality 775 may operate similarly (e.g., when the connection 777 is unavailable, communication requests from entities in the service area of the second local carrier 776 may be unable to access entities within the PCN 120, including the PSAP 726).

The recovery network 140, as disclosed herein, may be used to allow the local carriers 772 and/or 776 to access the PCN 120 (and PSAP 726) independently of the connections 773 and/or 776 thereto. In the FIG. 7A example, when the connection 773 of the first local carrier 772 to the PCN 120 is unavailable, the recovery network 140 may provide an alternative path (satellite network 150) through which communication requests to/from the PCN 120 may be serviced. Accordingly, communication requests from entities within the service area of the first local carrier 772 may be directed through the recovery network 140 (e.g., via the satellite communication path 150) to entities within the PCN 120, including the PSAP 726. Accordingly, the recovery network 140 may prevent the municipality 771 from being isolated from the PCN 120 while the connection 773 is unavailable.

Figure 7B:
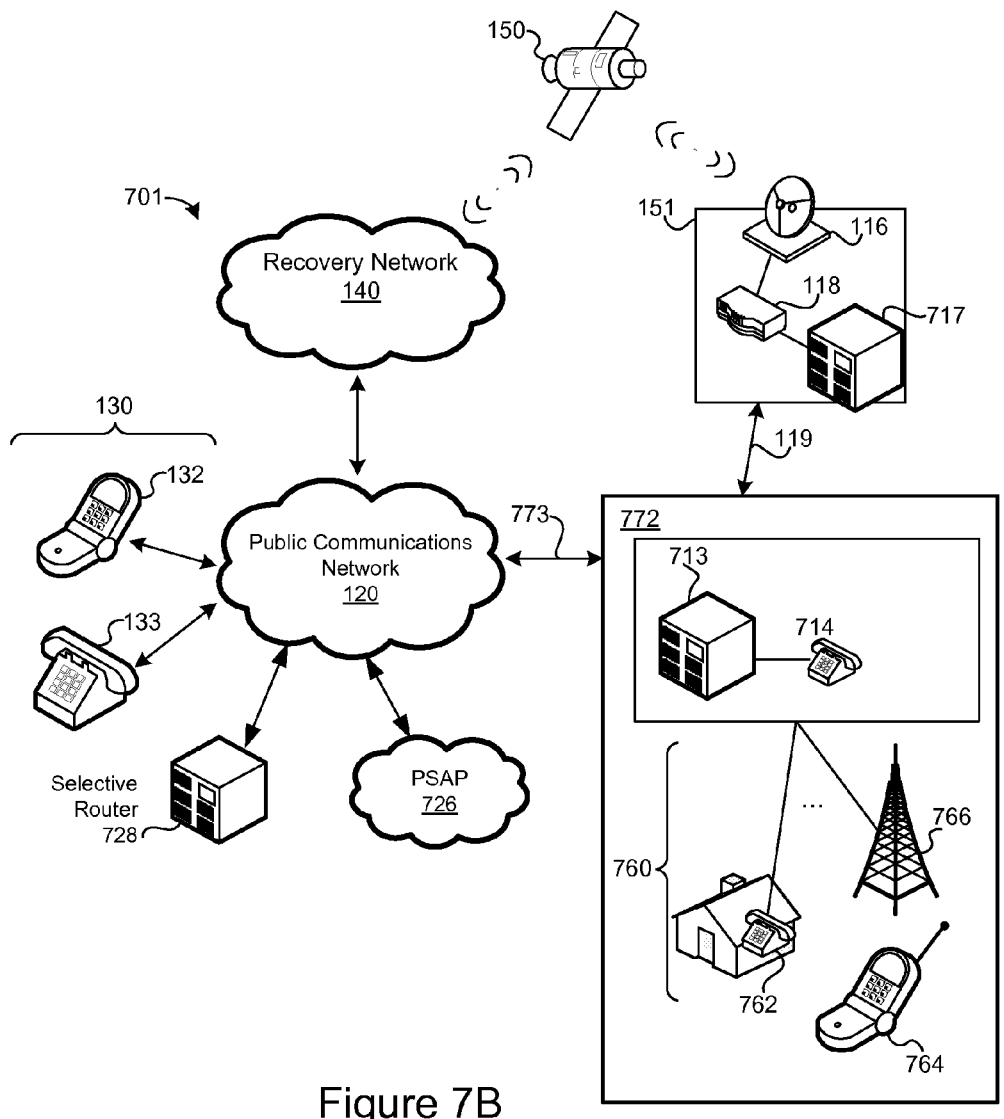
FIG. 7B is a block diagram of one embodiment of a system comprising a local carrier communicatively coupled to a recovery network via an alternative communication path.

FIG. 7B depicts one example of a system 701 for providing an alternative communication path to a local carrier. The local carrier 772 may have a connection 773 (e.g., backhaul connection) to the PCN 120. The local carrier 772 may include switching equipment 713 configured to provide communication services to the entities 760 within its service area (e.g., within a municipality, region, town, county, or the like). For example, the local carrier 772 may service telephone calls from a land line telephone 762 and/or cellular communications received via an RF communication tower 766 from a cellular phone 764, and so on. One of skill in the art would recognize that the local carrier 772 could receive and/or service many different types of communication requests from many different types of devices within the service area 760, such as VOIP traffic, data traffic, fax traffic, and so on. As such, this disclosure should not be read as limited to in this regard.

The system 701 includes an alternative communication path connection 151, which, in the FIG. 7B example, comprises a satellite receiver 116 and gateway 118 (PRI in the Sky). The gateway 118 may be configured to service communication requests using an alternative communication path (e.g., satellite 150) and the recovery network 140 as described above. Accordingly, the gateway 118 may be configured to communicatively couple communications equipment 713 of the local carrier 772 to the recovery network 140. The gateway 118 may be communicatively coupled to the local carrier 772 using communications equipment (telecommunications switch) 717 and a communications interface 119, which may include, but is not limited to: a trunk line, a wireless link, a fiber-optic line, a T1 line, an ISDN line, or the like. Accordingly, in some embodiments, the alternative communication equipment 151 may be deployed at a different location than the local carrier 772. For example, the equipment 151 may be displayed at an organization, such as a fire station, emergency services dispatch center, or the like (one example of deployment at a PSAP described below in conjunction with FIG. 8). The communications equipment 717 may communicatively couple the gateway 118 to the local carrier 772. In some embodiments, the communications equipment 717 may be shared with the organization (e.g., the gateway 118 may integrate with the telephone system communication equipment 717 of an emergency dispatch service). Alternatively, or in addition, the alternative communication equipment 151 may comprise its own, dedicated communication equipment 717.

In some embodiments, the alternative communication equipment 151 (the satellite transceiver 116, gateway 118, and the like) may deployed at the local carrier 772 (e.g., within the same facility, co-located, or the like). In these embodiments, the gateway 118 may be directly coupled to the communications equipment 713 of the local carrier 772.

When the connection 773 of the first local carrier 772 to the PCN 120 is unavailable, communication services for the entities 760 within the service area of the first local carrier 772 may be serviced by the recovery network 140. The recovery network 140 and alternative communication path (e.g., satellite network 150) may operate as described above. When the local carrier 772 determines that the connection 773 is unavailable, the communications equipment 713 of the first local carrier 772 may be configured to service outbound communication requests directed to entities within the PCN 120, such as the PSAP 726, using the alternative communication equipment 151 (e.g., satellite network 150). Accordingly, the first local carrier 772 (and entities 760 serviced thereby) may not be isolated by a failure in the connection 773.

The communications equipment 713 of the local carrier may comprise a switch configured to service communication requests using the connection 773, and to failover to the recovery network 140 when needed. In some embodiments, the communications equipment 713 may failover by directing communication requests to the alternative communication network equipment 151 via the communication interface 119 using a trunk ID, a 10-digit number, or the like. The gateway 118 may receive these outbound communication requests (via the communications equipment 717) and service the requests using the alternative communication path 150. Alternatively, in embodiments in which the gateway 118 is co-located at the local carrier 772, the communications equipment 713 may redirect communication requests directly to the gateway 118.

In some embodiments, the recovery network 140 may be further configured to determine when recovery services are to be activated (e.g., in response to the recovery network 140 detecting an interruption in the connection 773 and/or receiving a command to activate recovery services). Responsive to determining that recovery services are to be activated, the recovery network 140 may cause the communications equipment 713 of the first local carrier to direct communication requests to the alternative path equipment 151 as described above. In addition, the recovery network 140 may configure the PCN 120 to divert communication requests directed to entities 760 within the service area of the first local carrier 772 to the recovery network 140, and may service the incoming communication requests using the satellite network 150 (or another processing mechanism as determined by inter alia a set of recovery rules) as described above. Alternatively, or in addition, the first local carrier 772 may provide one or more dedicated "direct response" communication devices 714, which may provide a means by which entities within the PCN 120 may contact the first municipality 771 while the connection 773 is unavailable. The direct response communication devices 714 may be provided in addition to, or in lieu of, the recovery network 140 servicing all inbound communication requests for the first local carrier 772. For example, while the connection 773 is unavailable, the recovery network 140 may only service inbound communication requests directed to the direct response device 714, in order to preserve bandwidth on the alternative communication path 150. Other communication requests may be backed up (or serviced within the PCN 120) as described above.

In some embodiments, the recovery network 140 may provide a general number to contact entities 760 within the municipality. The recovery network 140 may direct communication requests received at this general number to the communications equipment 151. The gateway 118 (or other communication equipment 717) may prompt the requester to provide additional information regarding the end-point of the request (e.g., the number of the entity 760 the caller wishes to reach). Using this information, the gateway 118 or communications equipment 717 may direct the request to the local carrier 772, which may connect the request to the appropriate entity 760. The communication request may then be serviced using the alternative communication path 150 and recovery network 140.

The operation of the recovery network 140 may be configured using recovery rules, which, as described above, may determine how particular communication requests (both inbound and outbound) are processed. For example, recovery rules may specify that all emergency calls (e.g., 911 calls) are to be recorded by the recovery network 140. In another example, recovery rules may specify which of a plurality of PSAPs 726 in the PCN 120 are to be assigned to handle which outbound communication requests.

In some embodiments, the system 701 may comprise a selective router 728, which may be configured to manage communication requests directed to a plurality of different PSAPs 726 in the PCN 120; the selective router 728 may select a PSAP 726 to handle each incoming PSAP communication request (e.g., each 911 call). The selection may be based upon a set of routing rules implemented by the selective router 728, such as rules based on proximity (e.g., as determined by ALI metadata accompanying the communication request), PSAP availability, and so on. In some embodiments, the recovery network 140 may be configured to direct communication requests to the selective router 728 as opposed to a particular PSAP 726. The redirection may comprise the recovery network 140 emulating a member of an emergency services network. Accordingly, the recovery network 140 may comprise an emergency services number (ESN) and may interact with the selective router 728 and/or PSAP(s) 726 as another PSAP (e.g., the recovery network 140 may emulate a PSAP).

Alternatively, or in addition, the recovery network 140 may comprise recovery rules that emulate the operation of the selective router 728. The recovery rules may, for example, comprise rules for selecting which of a plurality of PSAPs 726 should be used to service a particular communication request according to various selection factors, such as proximity, availability, and the like. These rules may be implemented when the PCN 120 does not include a selective router 728 and/or when the recovery network 140 detects that the selective router 728 is unavailable.

Although the systems 700 and 701 show a satellite alternative communication path 150, the disclosure is not limited in this regard and could be extended to include any number and/or types of alternative communication paths. Moreover, although FIG. 7B depicts the first local carrier 772, the second local carrier 776 of FIG. 7A could include similar components to communicatively couple the second local carrier 776 to the recovery network 140.

Figure 8:
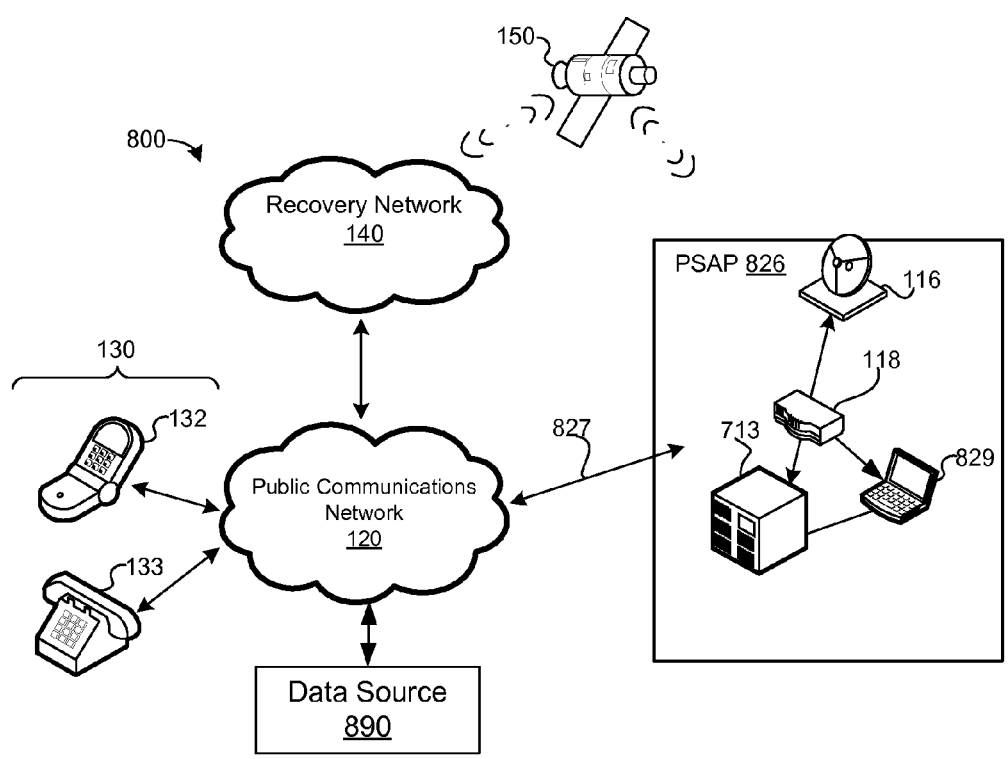
FIG. 8 is a block diagram of one embodiment of a system comprising a public safety answering point communicatively coupled to a recovery network via an alternative communication path.

FIG. 8 depicts one embodiment of a system 800 comprising a recovery network 140. In the FIG. 8 example, a PSAP 826 (or other emergency services provider) may be communicatively coupled to the PCN 120 via a connection 827. The connection 827 may comprise one or more backhaul, land line, fiber optic, wireless, or other connections. The PSAP 826 may include one or more receiving stations 829 which may be used to respond to inbound communication requests. When inbound communication requests are received, the receiving station 829 may be configured to access metadata related to the request, such as Automatic Number Identification (ANI), Automatic Location Identification (ALI), caller identification (CID), or the like. The metadata may be accessed from a data source in the PCN 120, such as data source 890.

The PSAP 826 may be communicatively coupled to the recovery network 140 via an alternative communication path, such as the satellite communication path 150. Accordingly, the PSAP 826 may include a satellite interface 116 and gateway 118 which, as described above, may provide an alternative communication path by which the PSAP 826 may communicate with entities within the PCN 120. The gateway 118 may be coupled to the communications equipment of the PSAP 826 to communicatively couple the PSAP 826 to the PCN 120 when the PCN connection 827 is unavailable. In addition to servicing communication requests directed to the PSAP 826 using the satellite network 150 (or other mechanism), the recovery network 140 may be configured to provide the PSAP 826 with metadata related to the communication requests, such as ANI and/or ALI metadata. In some embodiments, the recovery network 140 may obtain metadata associated with communication requests directed to the PSAP 826, and include the metadata with the communication requests. Alternatively, or in addition, the PSAP 826 may make outbound requests for metadata using the alternative communication path 150; for example, the recovery network 140 may provide an IP connection to the data source 890 (via the alternative communication path 150), which may be used by the PSAP 826 to obtain metadata related to incoming communication requests. In some embodiments, the recovery network 140 may provide some metadata with incoming communication requests, and other metadata items may be obtained by the PSAP 826 via the alternative communication path 150. Accordingly, In some embodiments, the gateway 118 (and/or other communications equipment) may be coupled to the existing communication equipment 713 of the PSAP 826 to deliver both communication requests and associated metadata. Accordingly, the gateway 118 may be configured to emulate a Centralized Automated Message Accounting (CAMA) trunk or other standard interface.

The recovery network 140 may include one or more recovery rules specifying the metadata to obtain for and/or include with communication requests directed to the PSAP 826. In accordance with the recovery rules, when the recovery network 140 receives communication requests directed to the PSAP 826, the recovery network 140 may obtain metadata (ANI and/or ALI) associated therewith (using a data source, such as the data source 890), and provide the metadata to the PSAP 826 via the satellite network 150. The metadata obtained for a particular communication request may be provided "in-line" with the communication request and/or on a separate channel multiplexed therewith to be extracted by the gateway 118. The mechanism(s) by which the metadata is to be provided by the recovery network 140 may be determined by the communication protocol of the communication request and/or according to the preferences of the PSAP 826 (as defined by the recovery rules discussed above). For example, ALI metadata identifying the location of an emergency services caller may be provided to the PSAP 826 as a separate data stream or element, which may be communicated separately from the communication request data (e.g., multiplexed and/or packetized separately from the communication request data). The gateway 118 may be configured to de-multiplex (or otherwise extract) the metadata from communication request data, and to route the data accordingly. For example, the gateway 118 may route ALI metadata to the receiving station 829, while the communication request data (voice data) is routed to the communication equipment 713. Other types of metadata, such ANI metadata, may be included with the communication request itself. In some embodiments, the gateway 118 (or other equipment) may emulate a CAMA trunk (or other communication interface) capable of providing communication requests with associated metadata to the existing communication equipment 713 of the PSAP 826. Alternatively, or in addition, the gateway 118 may provide a communications channel (e.g., IP connection) whereby the PSAP 826 may request communication request metadata from data sources within the PCN 120 (e.g., to access data source 890 using the communications equipment 713 and/or receiving station 829).

Although FIG. 8 describes ANI and ALI metadata, the disclosure is not limited in this regard and could be extended to include any form and/or type of metadata known in the art (e.g., CID, region identification, language identification, etc.). Moreover, although FIG. 8 includes a PSAP 826, the recovery network 140 may be configured to provide metadata to any entity or organization, such as local carriers, long distance carriers, business organizations, other emergency services organizations (e.g., hospitals, police stations, fire departments, etc.), disaster or other public information services such as 2-1-1, 3-1-1, 6-1-1, etc., calling services, marketing organizations, and so on.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable medium having stored instructions thereon that may be used to program a computer (or other electronic device) to perform processes described herein. The computer-readable medium may include, but is not limited to: hard drives, floppy diskettes, optical discs, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that perform one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

What is claimed is:

1. A recovery network to provide communication recovery services to a plurality of entities within a service area of a carrier, the carrier comprising a connection to a public communication network, the recovery network comprising:
    an alternative communication path to communicatively couple the plurality of entities in the service area of the carrier to the recovery network; and
    a soft switch communicatively coupled to the public communication network and the alternative communication path, wherein the soft switch is configured to receive a communication request originating from an entity in the service area of the carrier and directed to a recipient within the public communication network via the alternative communication path and is configured to service the communication request using the public communication network and the alternative communication path.

2. The recovery network of claim 1, wherein the alternative communication path communicatively couples the recovery network to the carrier independently of the public communication network and the connection of the carrier to the public communication network.

3. The recovery network of claim 1, wherein the alternative communication path comprises a satellite communication network.

4. The recovery network of claim 1, wherein the alternative communication path comprises a radio frequency network.

5. The recovery network of claim 1, wherein the alternative communication path comprises a wireless Internet protocol network.

6. The recovery network of claim 1, wherein the alternative communication path comprises an Internet protocol network, and wherein the public communication network comprises a public switched telephone network.

7. The recovery network of claim 1, wherein the communication request is directed to an emergency dispatch service accessible in the public communication network, and wherein the soft switch is configured to service the first communication request using the public communication network and the alternative communication path.

8. The recovery network of claim 7, wherein the emergency dispatch service comprises one of a public safety answering point and a public information service.

9. The recovery network of claim 1, wherein the communication request is directed to an information service accessible in the public communication network, and wherein the soft switch is configured to service the first communication request using the public communication network and the alternative communication path.

10. The recovery network of claim 1, wherein the communication request comprises a voice telephone communication request.

11. The recovery network of claim 1, the communication request comprises an Internet protocol communication request.

12. The recovery network of claim 1, further comprising a gateway configured to communicatively couple communications equipment of the carrier to the alternative communication path.

13. The recovery network of claim 12, wherein the gateway is configured to compress communication data transmitted from the carrier to the recovery network via the alternative communication path.

14. The recovery network of claim 12, wherein the gateway is configured to format data received on the alternative communication path into a format suitable for the communications equipment of the carrier.

15. The recovery network of claim 1, wherein the soft switch is configured to reconfigure the public communication network to route communication requests directed to the carrier to the soft switch.

16. A method for providing recovery services to a carrier, the carrier providing communication services to a plurality of entities within a service area thereof and comprising a connection to a public communication network, the method comprising:
providing an alternative communication path to communicatively couple the carrier to a recovery network, the alternative communication path being independent of the public communication network and the connection of the carrier to the public communication network;
receiving at the recovery network a communication request originating from an entity within the service area of the carrier, the communication request being directed to a recipient within the public communication network and outside of the service area of the carrier, wherein the communication request is received via the alternative communication path; and
servicing the communication request using the public communication network and the alternative communication path.

17. The method of claim 16, wherein the alternative communication path comprises a satellite communication network.

18. The method of claim 16, wherein the communication request is directed to an emergency dispatch service.

19. The method of claim 16, wherein the communication request is directed to an information service.

20. The method of claim 16, further comprising:
obtaining metadata related to the communication request; and
providing the metadata to the recipient of the communication request.

21. The method of claim 16, further comprising:
reconfiguring the public communication network to route one or more communication requests directed to entities within the service area of the carrier to the recovery network; and
forwarding one or more communication requests directed to entities within the service area of the carrier to the carrier via the alternative communication path.

22. The method of claim 21, wherein the carrier comprises a direct response line, and wherein the one or more communication requests forwarded to the carrier are received at the direct response line.

23. A recovery network to provide communication recovery services to an organization communicatively coupled to a public communication network, the recovery network comprising:
an alternative communication path to communicatively couple the recovery network to the organization; and
a soft switch communicatively coupled to the public communication network and the alternative communication path, wherein the soft switch is configured to receive communication requests directed to the organization from the public communication network and to service one or more of the communication requests using the alternative communication path;
wherein the alternative communication path provides metadata associated with a communication request to the organization.

24. The recovery network of claim 23, wherein the metadata is provided with the communication request.

25. The recovery network of claim 23, wherein the metadata is provided separately from the communication request.

26. The recovery network of claim 23, wherein the recovery network is configured to obtain metadata related to the communication request from a data source accessible in the public communication network.

27. The recovery network of claim 23, wherein the metadata comprises one or automatic location identification, automatic number identification, and caller identification metadata.

28. The recovery network of claim 23, further comprising a gateway communicatively coupled to communication equipment of the organization via a communication interface, and wherein the metadata is provided to the organization via the communication interface.

* * * * *